(12) United States Patent
Koros et al.

(10) Patent No.: US 8,377,172 B2
(45) Date of Patent: Feb. 19, 2013

(54) FIBER SORBENTS

(75) Inventors: William John Koros, Atlanta, GA (US); Dhaval A. Bhandari, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 555 days.

(21) Appl. No.: 12/578,356

(22) Filed: Oct. 13, 2009

(65) Prior Publication Data

US 2010/0313755 A1 Dec. 16, 2010

Related U.S. Application Data

(60) Provisional application No. 61/224,009, filed on Jul. 8, 2009, provisional application No. 61/186,074, filed on Jun. 11, 2009.

(51) Int. Cl.
*B01D 53/02* (2006.01)
(52) U.S. Cl. ............... 95/135; 96/108; 96/154; 264/41; 264/167; 264/423; 55/527; 55/528
(58) Field of Classification Search .................. 55/528; 96/15, 67; 264/41, 167, 423; 210/502.1, 210/679, 484, 487, 493.1, 493.5, 503, 505; 428/283, 296, 297, 408, 331, 398; 442/353, 442/50, 381
See application file for complete search history.

(56) References Cited

U.S. PATENT DOCUMENTS

| | | | | |
|---|---|---|---|---|
| 3,925,041 A | * | 12/1975 | Patterson et al. | 96/133 |
| 4,284,594 A | * | 8/1981 | Joh et al. | 264/41 |
| 4,322,381 A | * | 3/1982 | Joh | 264/41 |
| 4,323,627 A | * | 4/1982 | Joh | 428/398 |
| 4,960,520 A | * | 10/1990 | Semmens | 210/640 |
| 5,288,304 A | * | 2/1994 | Koros et al. | 95/45 |
| 5,486,410 A | * | 1/1996 | Groeger et al. | 442/353 |
| 5,820,659 A | * | 10/1998 | Ekiner et al. | 96/8 |
| 7,402,132 B2 | * | 7/2008 | Matthews | 588/256 |
| 7,691,168 B2 | * | 4/2010 | Fox et al. | 55/528 |
| 7,988,860 B2 | * | 8/2011 | Kalayci et al. | 210/679 |
| 8,133,308 B2 | * | 3/2012 | Lively et al. | 96/154 |
| 2004/0217049 A1 | * | 11/2004 | Bayer et al. | 210/500.36 |

FOREIGN PATENT DOCUMENTS

| | | |
|---|---|---|
| WO | 09003171 | 12/2008 |
| WO | 09003174 | 12/2008 |

OTHER PUBLICATIONS

Bhandari, Dhaval; Bessho, Naoki; Koros, William J., "Hollow Fiber Sorbents for Desulfurization of Natural Gas." School of Chemical and Biomolecular Engineering, Georgia Institute of Technology. Ind. Eng. Chem. Res. May 28, 2010, 49. pp. 12038-12050. Print.

* cited by examiner

*Primary Examiner* — Duane Smith
*Assistant Examiner* — Minh-Chau Pham
(74) *Attorney, Agent, or Firm* — Gregory L. Porter; Andrews Kurth LLP

(57) ABSTRACT

The present invention relates to new fibers, new processes of using said fibers, and new sheath dope compositions for multi-layer spinning processes. The fibers comprise a porous core and a sheath surrounding said porous core. The fibers may be useful in, for example, processes for removing low level contaminants like sulfur compounds from a gas stream like natural gas.

25 Claims, 18 Drawing Sheets

Two Phase Binodal Curve of Fiber Sorbent Dope

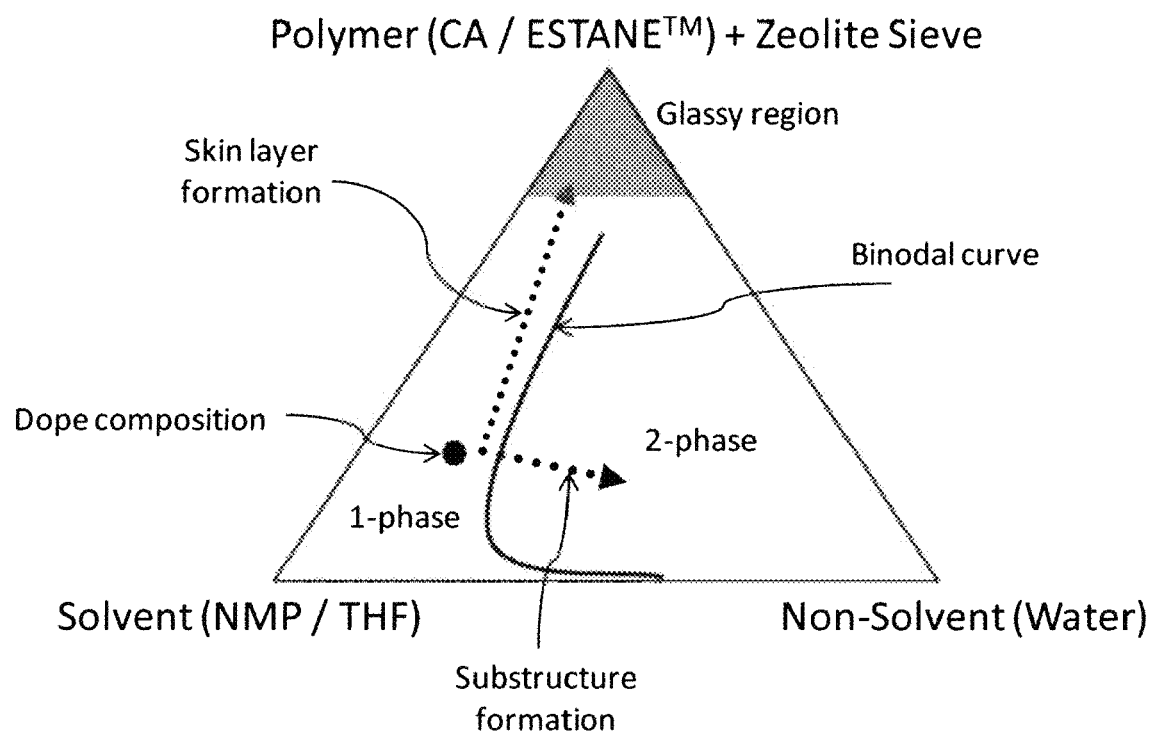
Figure 1 Two Phase Binodal Curve of Fiber Sorbent Dope

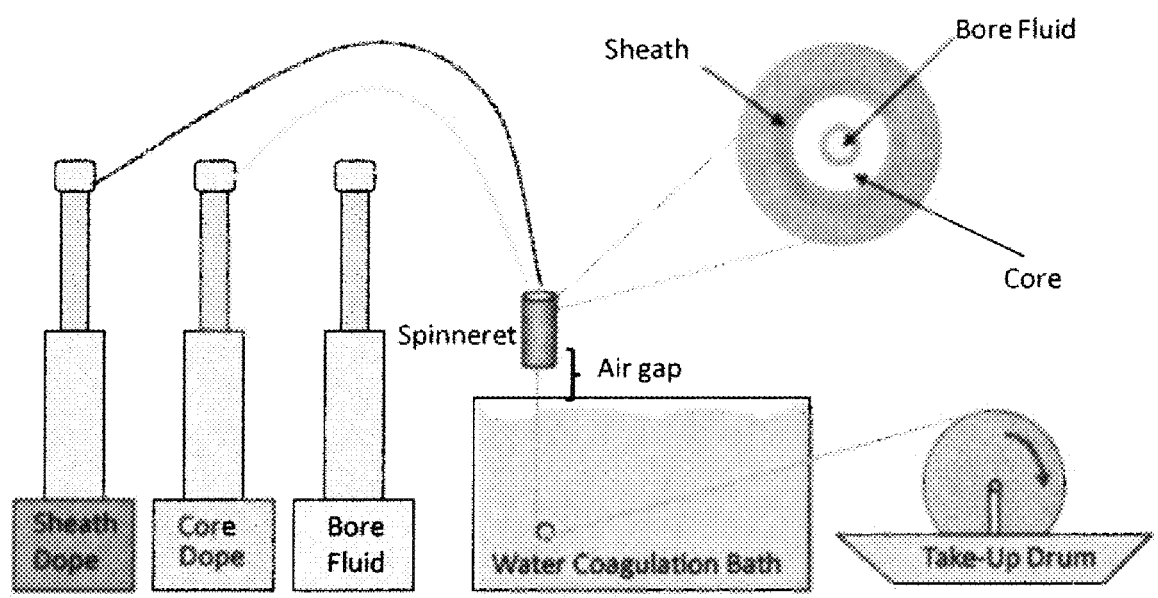
Fig. 2 Schematic diagram of fiber spinning apparatus

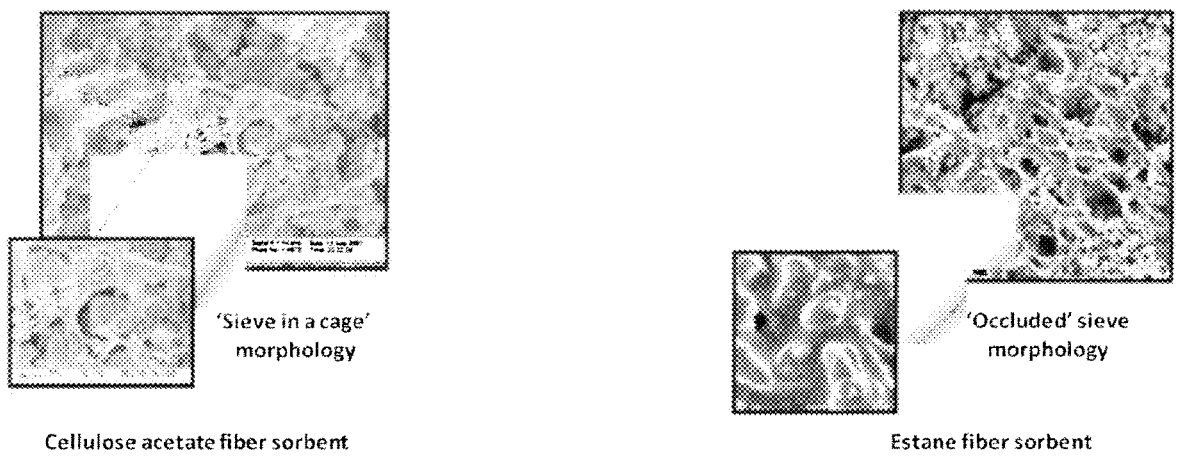
Fig. 3 Comparison of fiber sorbent morphologies

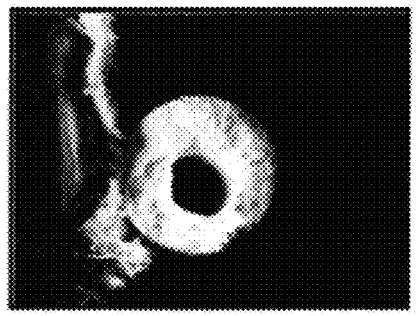
Cross section of single layer fiber sorbent
Porous core layer
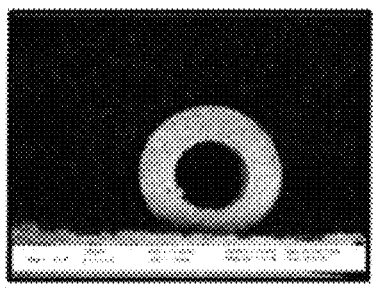
Cross section of dual layer fiber sorbent
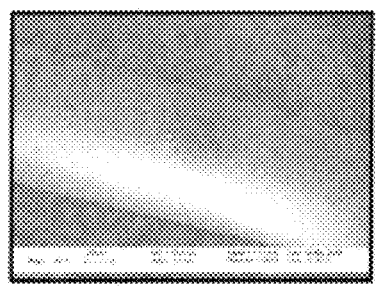
Uniform covering of fiber sorbent
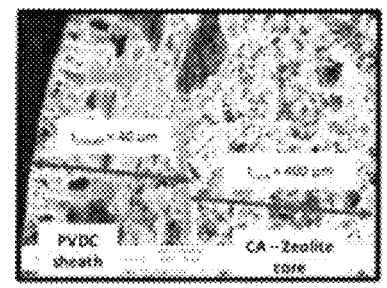
Macrovoids in the barrier layer
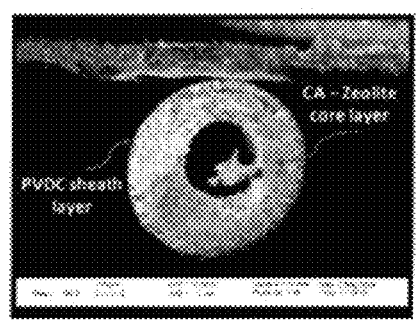
Cross section of dual layer fiber sorbent
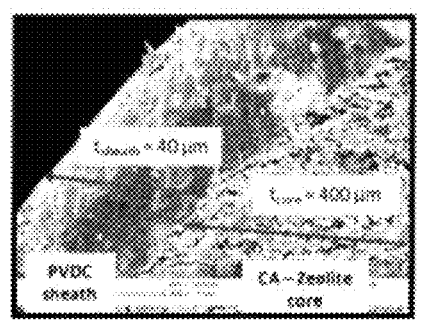
Macrovoid free dense barrier layer
Fig. 4 SEM images of single and dual layer fiber sorbents

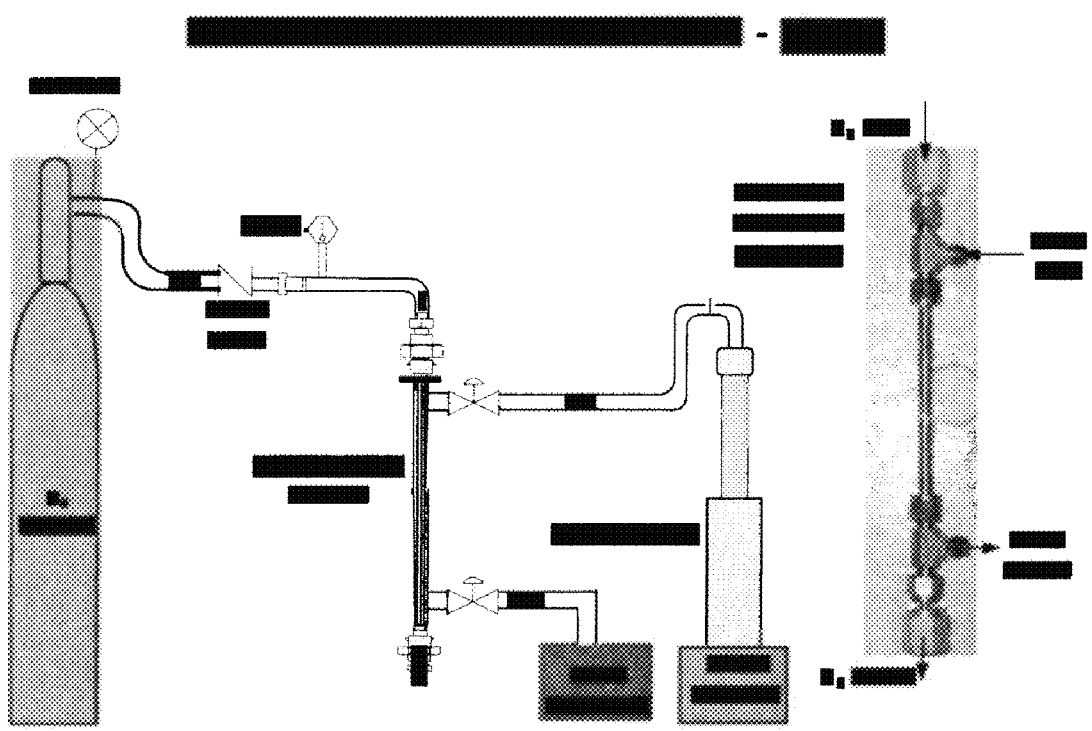
Fig. 5 Post treatment method setup with Diofan® flow through module

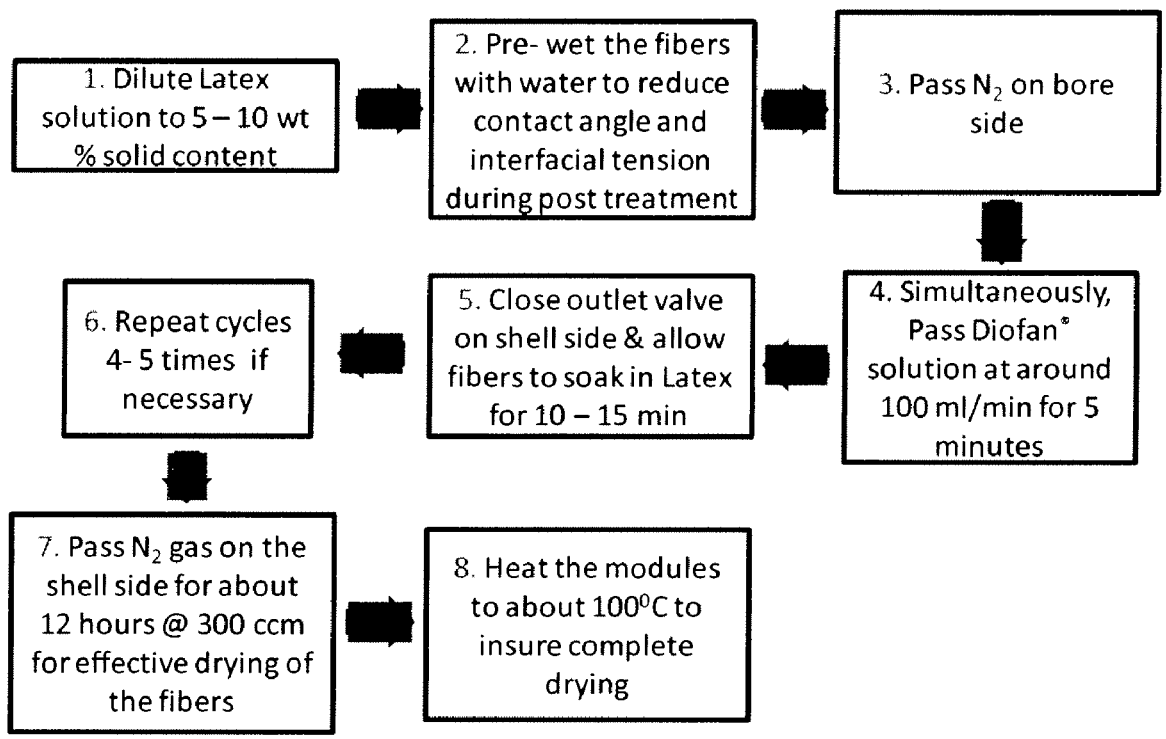
Fig. 6 Post treatment protocol

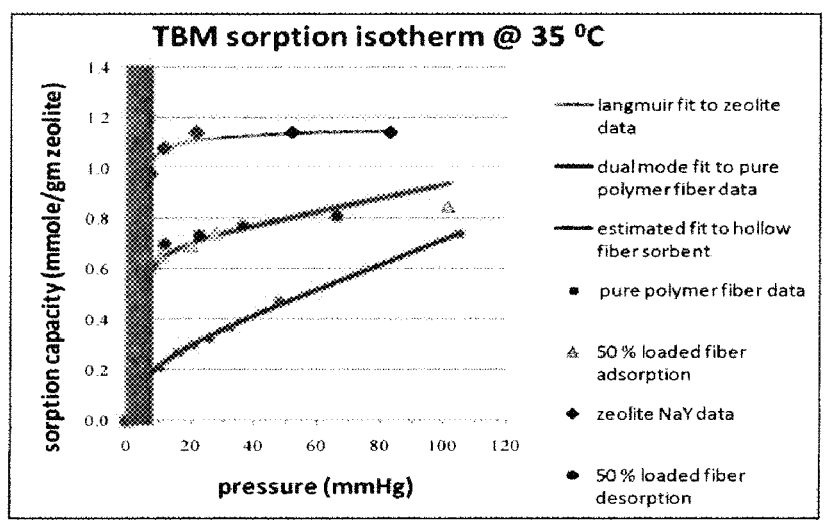
Fig. 7 Equilibrium isotherms of pure TBM on fiber sorbents and its individual components

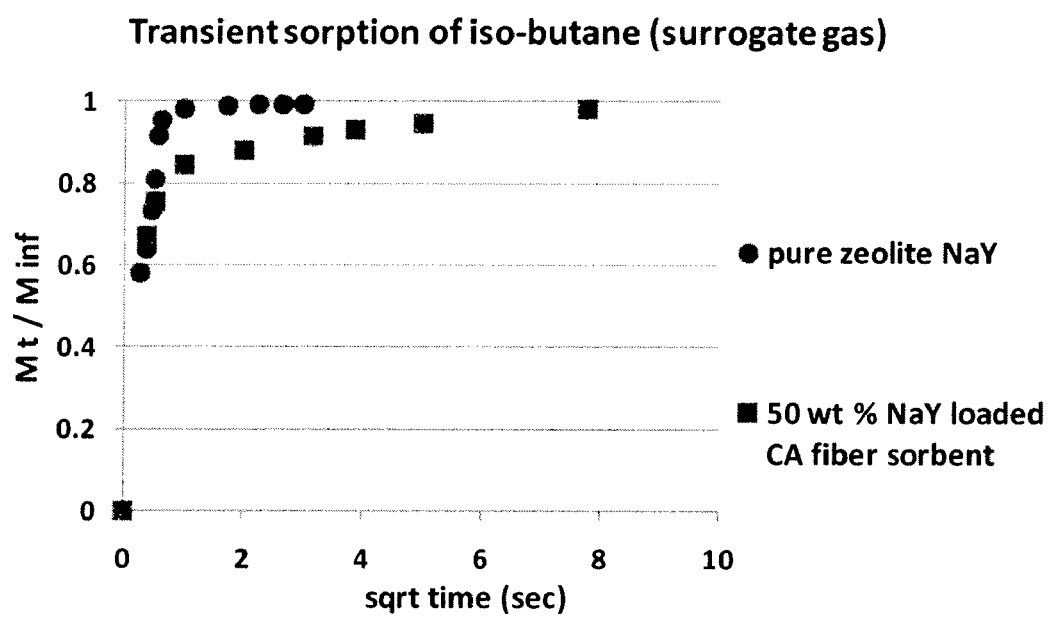
Fig. 8 Transient sorption isotherm of pure tert - butane (surrogate gas) on zeolite NaY

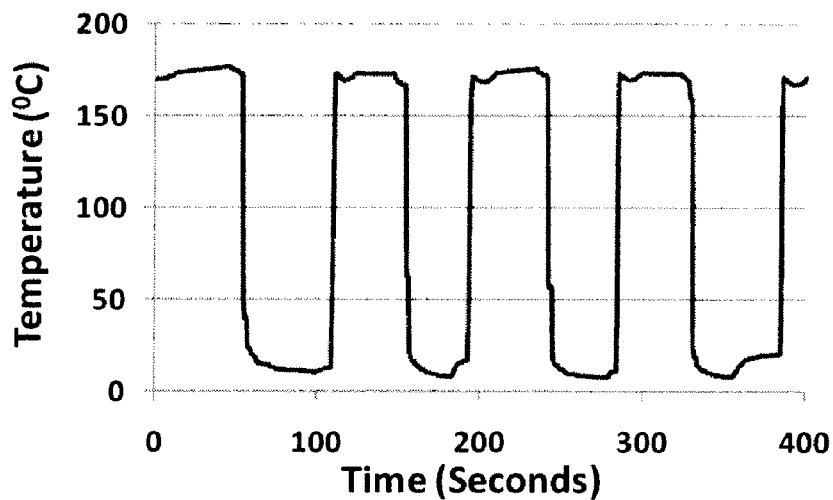
Fig. 9 Graph indicating continuous temperature swing cycles on empty module
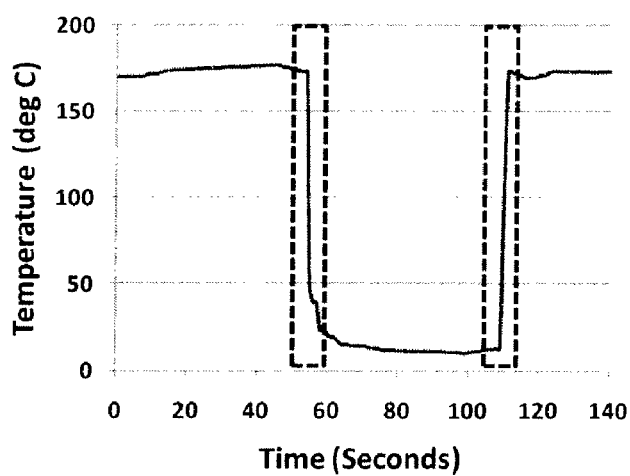
Fig. 10 Graph indicating heating and cooling cycle times

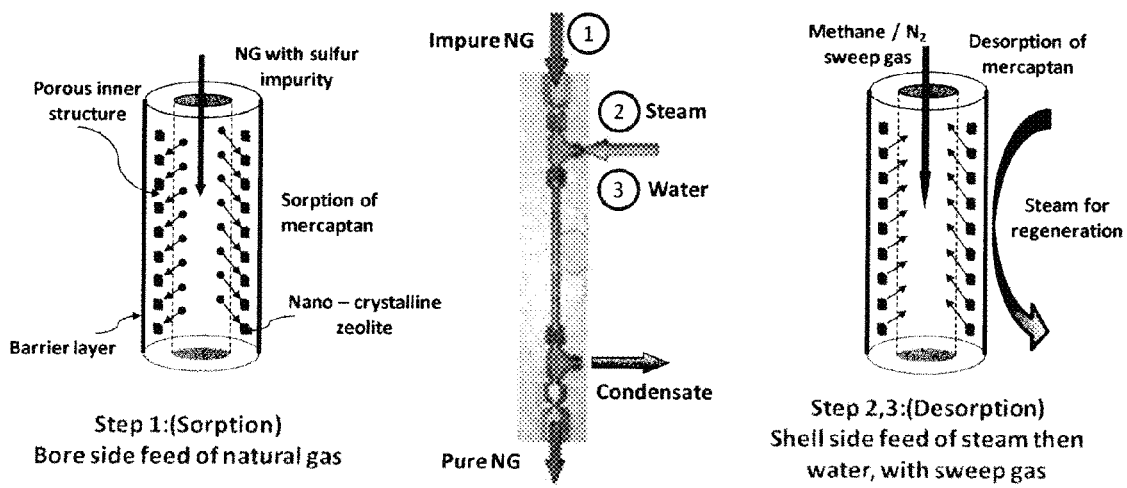
Fig. 11 Schematic diagram of the mode of operation of lab scale TSA setup. The cycles will be operated in a continuous manner

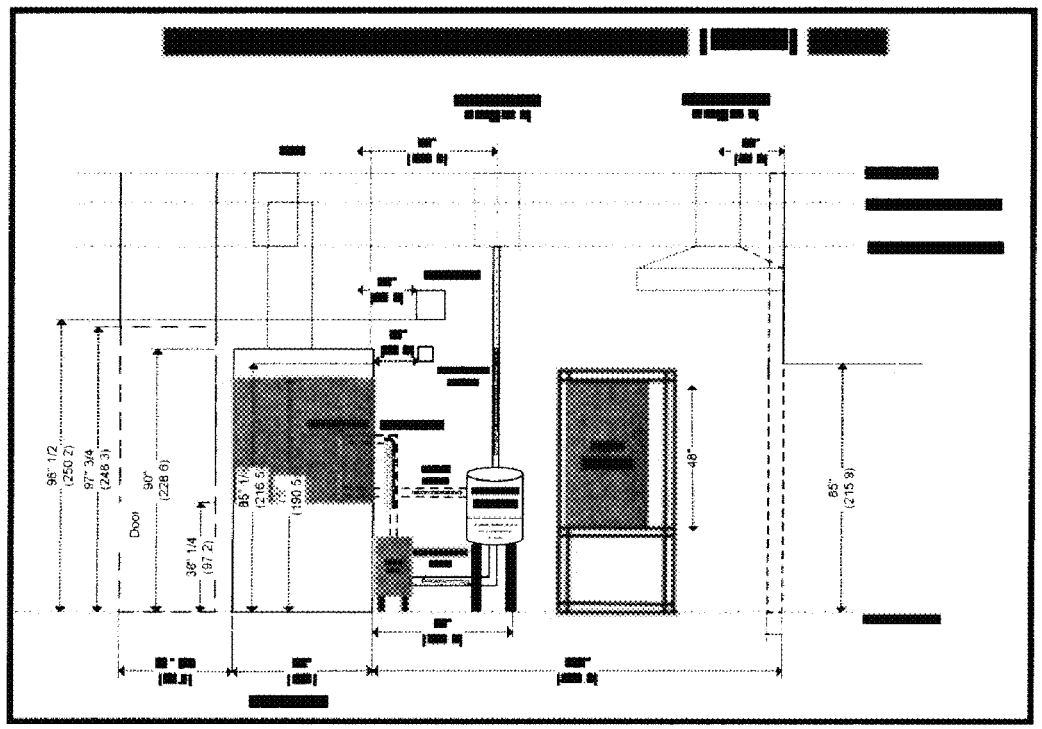
Fig. 12 TSA Setup
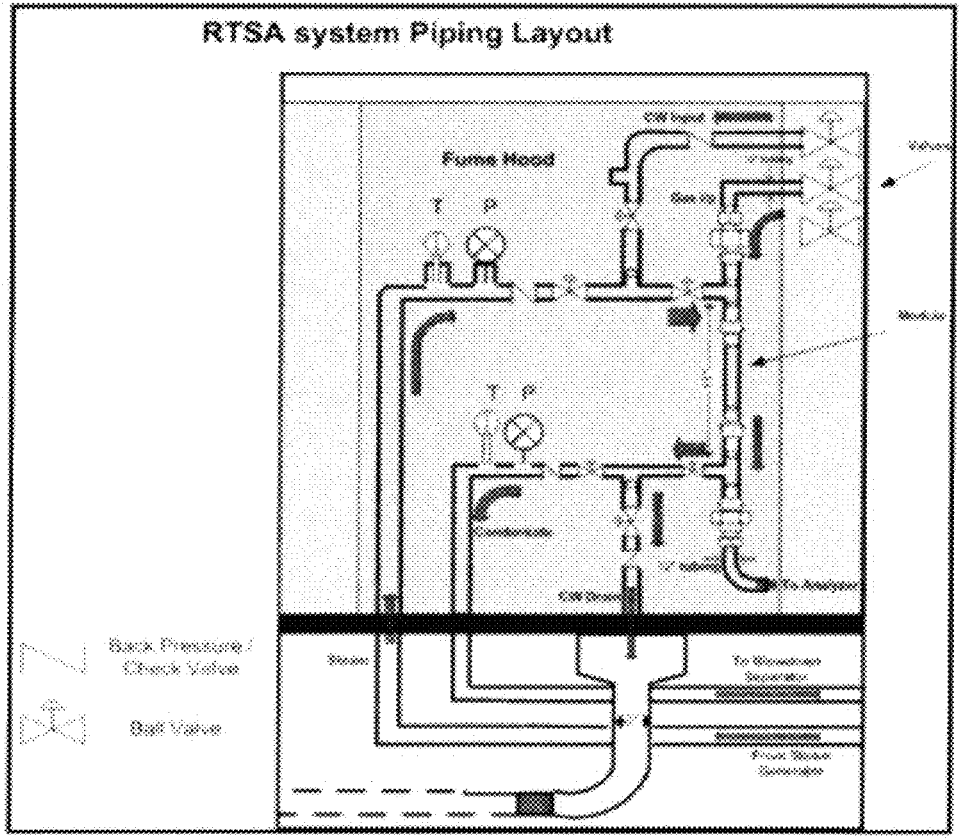

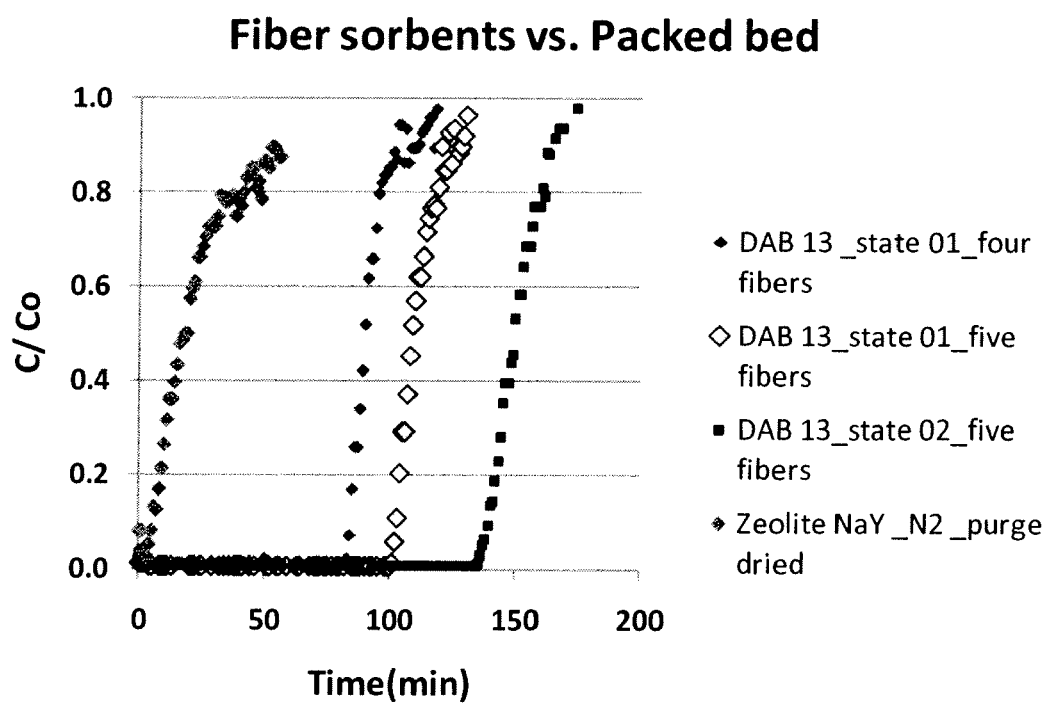
Fig. 13 Sorption curves of fiber sorbents and zeolite packed bed

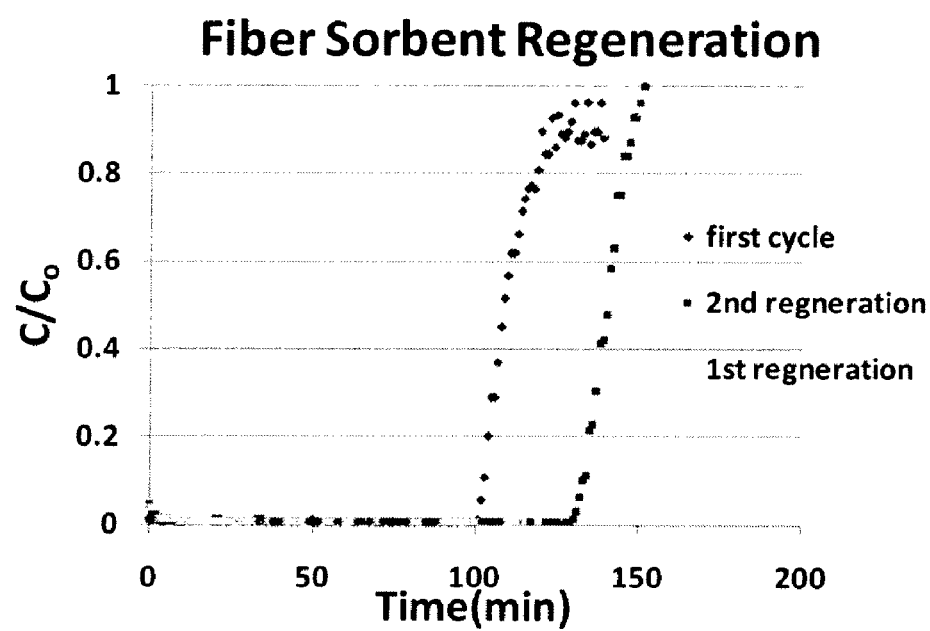
Fig. 14 Sorption characteristics of regenerated fiber sorbents

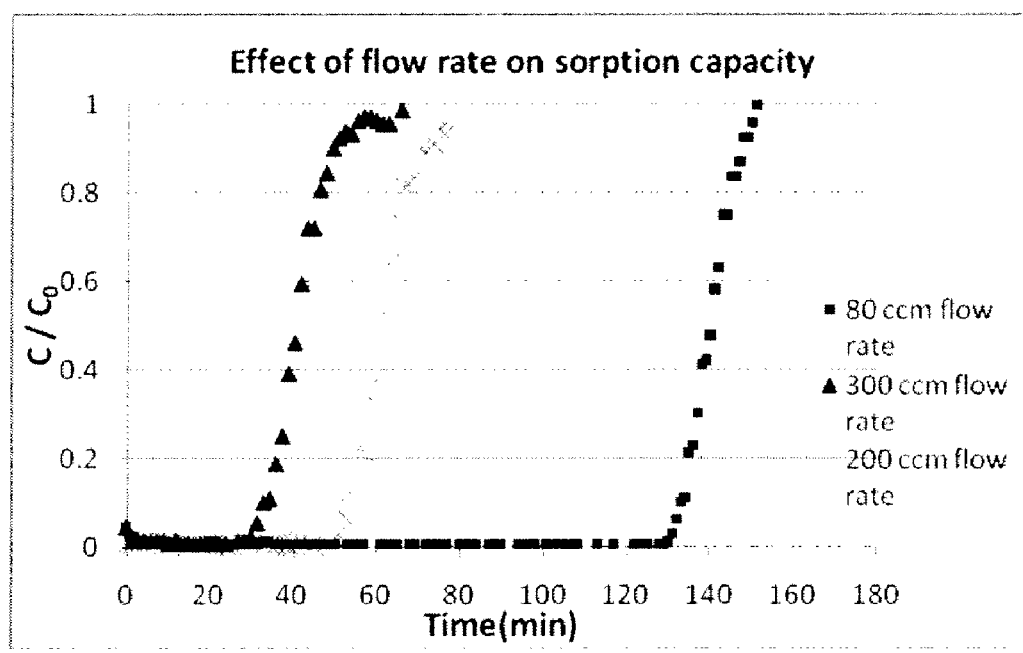
Fig. 15 Graph indicating the effect of flow rate on fiber sorbent capacity

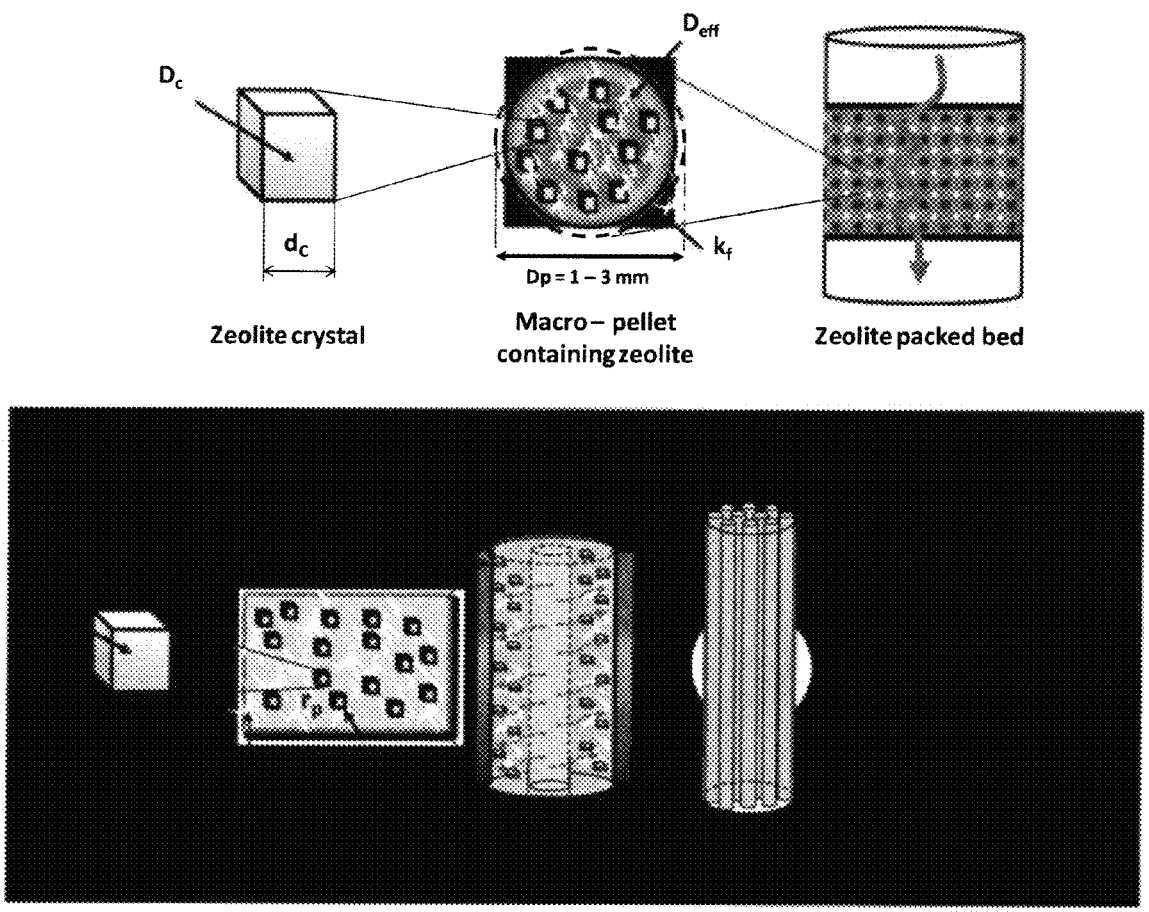
Figure 16 Resistances of Pellets vs. Fiber Sorbent

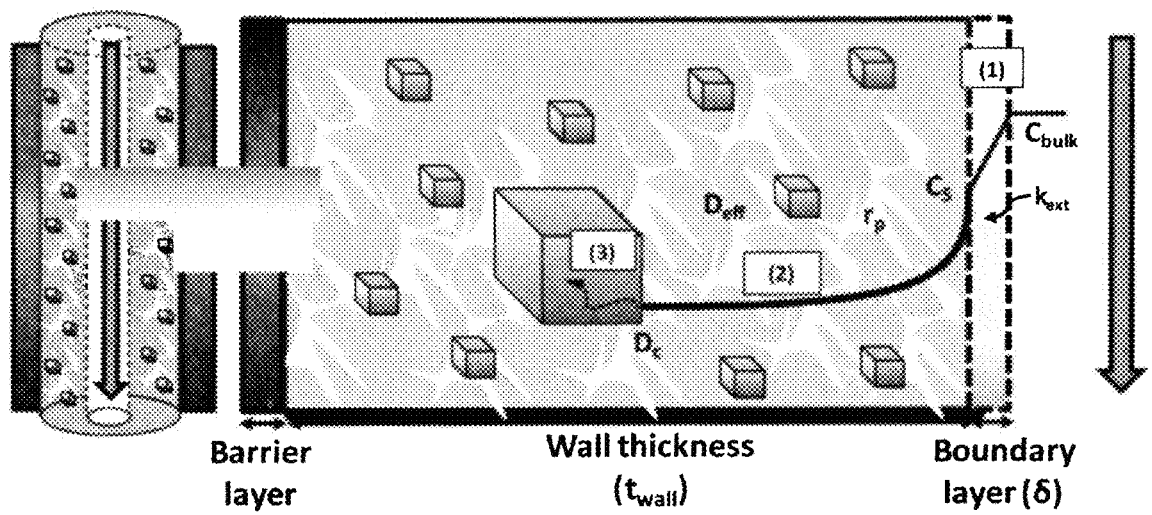
Figure 17 Schematic diagram indicating the various mass transfer resistances in fiber sorbents

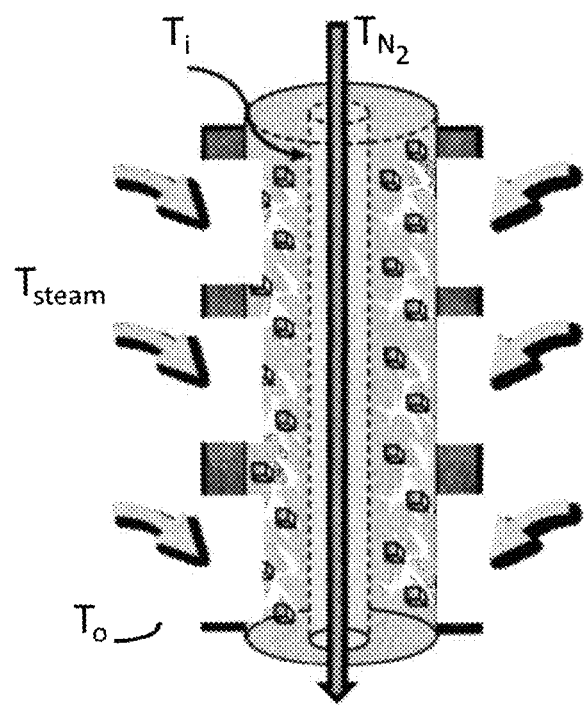
Figure 18 Schematic diagram indicating the various heat transfer resistances in fiber sorbents.

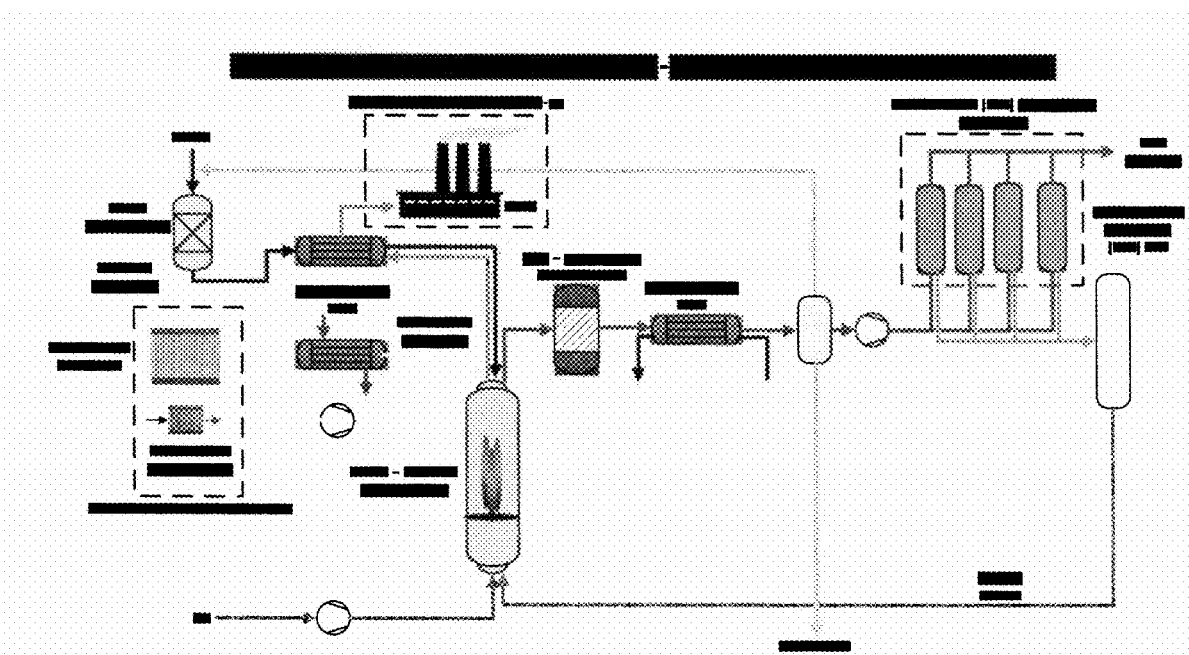
Figure 19 Block diagram of fiber sorbents in on-site hydrogen generation station

FIBER SORBENTS

RELATED APPLICATIONS

This application claims priority to U.S. provisional application 61/186,074 filed Jun. 11, 2009 and U.S. provisional application 61/224,009 filed Jul. 8, 2009 which for purposes of U.S. patent practice are each fully incorporated herein by reference to the extent not inconsistent with this application.

FIELD OF THE INVENTION

Provided herein are new fibers and processes of using said fibers for removing low level contaminants like sulfur compounds from a gas stream like natural gas. Also, provided are compositions suitable for making a sheath on a fiber made in, for example, a multi-layer spinning process.

BACKGROUND AND SUMMARY OF THE INVENTION

High global demand, national security and climate change issues related to conventional fossil fuels have contributed to a need for more environmentally benign fuels. As such fuel-cells such as proton exchange membrane fuel cell (PEMFC) and solid oxide fuel cell (SOFC) have been explored. However, while both are believed to be energy efficient and clean energy generating systems, they each require a low-sulfur fuel. One such low-sulfur fuel is hydrogen. Unfortunately, however, hydrogen distribution is currently lacking since transfer of hydrogen through pipelines in heavily populated areas may prove dangerous.

Another alternative fuel source for some fuel cells is pipeline natural gas. However, a potential problem with unprocessed pipeline natural gas is that it often may have up to 4-5% hydrogen sulfide ($H_2S$) along with other sulfur compounds. Processing of natural gas to remove sulfur may be carried out by amine absorption. However, the amine absorption processing may leave residual $H_2S$ as a contaminant at concentrations of, for example, 5-10 ppm. In addition to $H_2S$, unprocessed pipeline natural gas also often contains other organic sulfur species that may be added as odorants. Common odorants include mercaptans (e.g., ethyl, isopropyl, and tertiary butyl), thiols (e.g., tetrahydrothiophene), and sulfides (e.g., dimethyl, diethyl). Thus, the concentration of sulfur in odorized natural gas can be in the range of a few ppm to as high as 30-60 ppm. And unfortunately, common noble metal catalysts for e.g. Nickel, Platinum, and Palladium which are commonly used for reforming may be poisoned by these sulfur compounds when the concentration levels exceed even 1 ppm.

When the concentration of sulfur compounds is on the order of unprocessed pipeline natural gas described above and the scale of operation is relatively small such as in fuel cells, energy intensive processes like amine absorption are not commercially attractive means of removing sulfur compounds. Other methods such as packed bed sorption using, for example, activated carbon is unattractive since activated carbon becomes pyrophoric when exposed to natural gas while using various metal oxides in packed bed sorption processes may require a high temperature. Accordingly, new methods and materials for removing low level contaminants from a gas stream are needed.

Methods for removing high levels of impurities have been described in the literature. For example, WO 2009/3171 describes a complex, multi-step process for making a hollow sorbent fiber which has a lumen within the fiber. The hollow fiber is then lined in a post-treatment step by pumping a dilute solution of polyvinylidene latex solution (40% or less by volume to avoid blocking the fiber bore) through the fibers followed by pumping the bore with humid nitrogen to avoid pinholes. The lumened fibers are then "capped" at both the ends near the potting seals. The lumened, capped hollow fibers may be packaged for removing $CO_2$ from flue gas in a relatively high feed flow process. The flow of gas on the sheath side and a regenerating media through the bore may result in a pressure drop and/or cause bypass or channeling rendering the fibers useless. In addition, the complex post-treatment step can result in potential blockages at higher concentrations which may limit the barrier layer. The method may be useful in reducing the concentrations of $CO_2$ from a high level of around 20% to about 1%, but it is not particularly useful for reducing the concentration to a very low level.

WO 2009/3174 describes a hollow fiber that may have a 50 micron or less thick barrier layer. The barrier layer may comprise "polyvinylidene chloride (PVDC), polyacrylonitrile, epichlorohydrin (Hydrin), polyether amide block co-polymer, glass, silica, alumina, metal, metal oxides, latex, other high barrier polymers, co-polymers thereof, or combinations thereof." Unfortunately, some of these materials may prove difficult to employ and/or may be ineffective or inefficient in certain processes, for example, removing low level contaminants from a gas stream. They also may prove difficult to use for a suitable exterior barrier layer in some applications due to, for example, poor structural integrity as in the case of glass.

Thus, there is still a need for a material and process which is capable of removing low level contaminants from a gas stream both effectively and efficiently. It would further be beneficial if the material could be made in an efficient manner that does not require complex post-treatment steps.

Advantageously, the instant invention pertains to a material and process which is capable of removing low level contaminants from a gas stream both effectively and efficiently. Fortunately, the material may be made in a manner that does not require the intricacies of forming an interior barrier layer lining a lumen and its associated problems of potential blockages and capping requirements. And the material may be made efficiently and effectively in a multi-layer spinning process.

In one embodiment, the invention pertains to a fiber comprising a porous core and a sheath surrounding said porous core. The core comprises a sorbent and a polymer. The sheath is characterized by a heat resistance of at least about 110° C. and one or more of the following:

(1) a water vapor transmission rate (WVTR) of less than about 50, preferably less than about 25, preferably less than about 10, preferably less than about 3 Barrer at 38° C. and 90% relative humidity; or (2) an $O_2$ permeability of less than about 10, preferably less than about 3, preferably less than about 0.5, preferably less than about 0.02 Barrer; or (3) an $N_2$ permeability of less than about 1, preferably less than about 0.7, preferably less than about 0.005 Barrer; or (4) a $CO_2$ permeability of less than about 20, preferably less than about 5, preferably less than about 0.5, preferably less than about 0.1 Barrer.

In another embodiment, the invention pertains to a composition suitable for making a sheath on a fiber in an improved multi-layer spinning process. That is, in a multi-layer spinning process for making a sheath on a fiber comprising spinning a sheath dope with a core dope to form a fiber comprising a porous core and a sheath surrounding said porous core the improvement comprises employing a sheath dope composition which comprises a polyvinylidene chloride and a solvent comprising a dipolar aprotic solvent wherein the polyvinylidene chloride comprises at least about 15 weight percent based on the total weight of the composition. This facilitates a solution of the problem in the prior art wherein dilute post-treatment solutions had to be employed to avoid clumping of fibers.

In another embodiment, the instant invention pertains to a process for reducing the amount of one or more low level contaminants of a gas stream. The process comprises contacting the gas stream comprising an initial concentration of one or more low level contaminants with one or more fibers. One or more of the fibers comprises a porous core and a sheath surrounding said porous core. The core comprises a sorbent and a polymer. The sheath is characterized by a heat resistance of at least about 110° C. and one or more of the following:

(1) a water vapor transmission rate (WVTR) of less than about 50, preferably less than about 25, preferably less than about 10, preferably less than about 3 Barrer at 38° C. and 90% relative humidity; or
(2) an $O_2$ permeability of less than about 10, preferably less than about 3, preferably less than about 0.5, preferably less than about 0.02 Barrer; or
(3) an $N_2$ permeability of less than about 1, preferably less than about 0.7, preferably less than about 0.005 Barrer; or
(4) a CO2 permeability of less than about 20, preferably less than about 5, preferably less than about 0.5, preferably less than about 0.1 Barrer.

The contacting is conducted in a manner such that the initial concentration of one or more low level contaminants in the gas stream is reduced by sorption of said one or more low level contaminants on said sorbent. Next, one or more fibers is regenerated by passing a regenerating fluid which has a temperature of at least about 50° C. over the sheath layer of said fiber in a manner such that the fluid does not substantially contact the porous core.

BRIEF DESCRIPTION OF THE DRAWINGS

FIG. 1 shows a two phase binodal curve of a fiber sorbent dope.
FIG. 2 shows a schematic diagram of a spinning apparatus.
FIG. 3 shows a comparison of two fiber sorbent morphologies.
FIG. 4 shows SEM images of single and dual layer fiber sorbents.
FIG. 5 shows a laboratory setup for a post-treatment step.
FIG. 6 is a description of post-treatment protocol.
FIG. 7 shows equilibrium isotherms of pure TBM on fiber sorbents.
FIG. 8 shows transient sorption isotherms of pure isobutane on zeolite NaY.
FIG. 9 is a plot of temperature vs. time.
FIG. 10 is a plot of temperature vs. time.
FIG. 11 is a schematic showing a mode of operation of the TSA setup.
FIG. 12 shows the TSA setup.
FIG. 13 shows fiber sorption curves of fiber sorbents and zeolite packed bed.
FIG. 14 shows sorption characteristics of regenerated fiber sorbents.
FIG. 15 is a graph indicating the effect of flow rate on fiber sorbent capacity.
FIG. 16 shows various resistances of pellets and fiber sorbents.
FIG. 17 is a schematic diagram indicating the various mass transfer resistances in fiber sorbents.
FIG. 18 is a schematic diagram indicating the various heat transfer resistances in fiber sorbents.
FIG. 19 is a block diagram showing fiber sorbents used in an on-site hydrogen generation station.

DETAILED DESCRIPTION OF THE INVENTION

As used herein, a compound comprising sulfur includes any compound or mixture of compounds that has at least one sulfur atom. Such compounds include those added as an odorant to natural gas such as, for example, from about 10-30 ppm of, for example, hydrogen sulfide, tetrahydrothiophene, $C_1$-$C_4$ mercaptans such as ethyl mercaptan and t-butyl mercaptan, thiols such as tetrahydrothiophene, and dialkyl sulfides (e.g., dimethyl sulfide and diethyl sulfide) and mixtures thereof. In regard to natural gas in the U.S. dimethyl sulfide and tertiary butyl mercaptan tend to be commonly added while in Europe tetrahydrothiophene may be added.

As used herein, the term "lumen" and "fiber" is as described in, for example, WO 2009/003171 which portions such as paragraph 42 are incorporated herein by reference to the extent that they are not inconsistent with the instant application.

General Fiber Description

In one aspect the inventive fibers comprise a porous core and a sheath surrounding said porous core. The core typically comprises a sorbent and a polymer. The sheath may comprise any suitable material and is usually characterized by a heat resistance of at least about 50, preferably at least about 80, more preferably at least about 110° C. Depending upon the desired application and particular materials employed, the sheath is also typically characterized by one or more to any and all combinations of any of the following parameters which are measured with the composition and amounts of the sheath in a film form:

(1) a water vapor transmission rate (WVTR) of less than about 50, preferably less than about 25, preferably less than about 10, preferably less than about 3 Barrer at 38° C. and 90% relative humidity; or
(2) an $O_2$ permeability of less than about 10, preferably less than about 3, preferably less than about 0.5, preferably less than about 0.02 Barrer; or
(3) an $N_2$ permeability of less than about 1, preferably less than about 0.7, preferably less than about 0.005 Barrer; or
(4) a CO2 permeability of less than about 20, preferably less than about 5, preferably less than about 0.5, preferably less than about 0.1 Barrer. The aforementioned $O_2$, $N_2$, and $CO_2$ permeabilities are at 35° C.

Porous Core Comprising Sorbent and Polymer

The porous core usually comprises at least a sorbent and a polymer. In one embodiment, the fiber comprises a lumen adjacent, preferably directly adjacent, to the porous core. In another embodiment, said lumen preferably does not have an internal barrier layer lining in that the porous core may be directly exposed to any gas flowing through said lumen.

The shape and cross-sectional area of a lumen and porous core is as described in, for example, WO 2009/003171 which portions such as paragraph 45-47 are incorporated herein by reference to the extent that they are not inconsistent with the instant application. The dimensions of the porous core differ depending upon the materials, concentrations, and desired applications. Typically, the outer diameter of the core may be at least about 100, or least about 800 up to about 1200, or up to about 2000 micrometers. The ratio of outer diameter to inner diameter of the core may generally range from about 1.5 to about 5. In one specific embodiment the inner diameter of the core may be up to about 400 micrometers while the outer diameter is about 800 micrometers. Similarly, the aspect ratio of fibers may be at least about 5 to about 1 and in some embodiments the aspect ratio may be up to about 1200 to about 1. If putting the fibers in, for example, a module where the fibers are substantially aligned, then one may vary the length of the module and/or the number of fibers in the module and/or the number of modules employed based on the application, and, more specifically, the desired breakthrough. Such modules wherein the one or more fibers are substantially aligned within a compartment comprising a gas stream inlet and outlet and a regenerating fluid inlet and outlet are described in, for example, WO 2009/003174 which portions such as FIGS. 2a and 2b and accompanying text are incorporated herein by reference to the extent that they are not inconsistent with the instant application.

The tortuosity and porosity of the of the core also vary depending upon the application. Typically, applications requiring a faster diffusion of gases in the core layer require a higher porosity. Tortuosity, which is the ratio between the actual diffusion path length and the net distance in the direction of flux or radial distance, is usually less than about 5 and preferably between about 2 and about 3 for many applications. The porosity, which is the void space inside the sorbent material, typically ranges between about 0 to about 1 and is preferably greater than about 0.2 or preferably greater than about 0.4.

The composition and amounts of the sorbent and polymer may vary depending upon the desired application of the fiber. Typically, the sorbent comprises at least 65 wt % or at least 75 wt %, up to about 85 wt % by weight of the fiber based on total dry fiber weight.

Similarly, the surface area and surface area to volume ratio of the sorbent varies by application, the type of sorbent selected and the loading in the fiber. For many applications a surface area of at least 200, or at least 500, or at least 700 $m^2/g$ is generally useful. For many applications a surface area to volume ratio of from about 100 to about 1000 $cm^2/cm^3$ is generally useful. Fortunately, this may be from about 5 to about 20 times higher than that of a typical packed bed. Useful sorbents for removing a variety of contaminants in varying concentrations may include those selected from the group consisting of molecular sieve zeolites, activated carbon, activated alumina, silicates, amine-grafted silica, silico-aluminophosphates, aluminosilicates, aluminophosphates, metal oxides, and mixtures thereof. Zeolite examples include those selected from the group consisting of zeolite 4A, 5A, Bx, NaX, NaY, faujasite, beta, mordenite, ZSM-5, ion exchanged zeolite such as those of Ag, Cu, Ni, and Zn, and mixtures thereof.

As an alternative to hydrophilic zeolites, MFI zeolite (high silica) with Si/Al ratio of from about 25 to about 50 may be employed in some applications. MFI zeolites often have less capacity than, for example, NaY. However, advantageously the capacity of most MFI zeolites do not decrease significantly when exposed to water vapor. Thus, more frequent regeneration cycles may be required for MFI zeolites compared to NaY zeolites used in fiber sorbents.

Considerations such as selectivity and potential regeneration may also be considerations when selecting a sorbent. Selectivity of fiber sorbent is described at, for example, WO 2009/003171 paragraph 50 which is incorporated herein by reference to the extent it is not inconsistent with the instant application. For example, if a desired application is removal of one or more compounds comprising sulfur then the selectivity may be important for the one or more compounds comprising sulfur over the feed gas stream, e.g., natural gas, a petrochemical stream, city gas, diesel fuel, gasoline, LPG, jet fuel, a reformate gas, naptha and mixtures thereof. The selectivity may depend on the gas pressure, temperature and type of sulfur compound. However, generally in regard to natural gas a useful selectivity of the sorbent for a compound comprising sulfur over methane may be from about 10 to about 70.

If the sorbent is to be regenerated then it may be useful to consider the desired regeneration method. That is, if temperature swing absorption is to be employed, then more useful sorbents will be capable of being exposed to the temperatures employed without significant degradation of significant components of the fiber. For example, more useful metal oxides may be those that can be regenerated below the melting points of any polymer or other fiber materials.

The sorbent's heat of sorption may also be a consideration in selecting a sorbent. This is particularly true if the sorbent is to be employed in removing, high levels of contaminants from a gas stream, for example, gas streams comprising greater than about 1% of one or more compounds comprising sulfur. Sorbents with a high heat of sorption can lead to an increase in the fiber sorbent temperature which may require cooling the fibers in some manner to maintain a constant temperature. For example, a cooling fluid such as water may be passed on the impermeable sheath side during the sorption stepif desired. Thus, a sorbent having a heat of sorption of from about −75 to about −37.5 kilojoules per mole may be more useful when employing gas streams having, for example, greater than about 1% of one or more compounds comprising sulfur (e.g., ethyl mercaptan).

The polymer of the porous core is generally any polymer or other material which allows the porous core to achieve its desired function. Such polymers include those selected from the group consisting of a cellulose acetate, polyvinylpyrrolidone, polysulfone, epichlorohydrin, a polyether amide block co-polymer, polyimides, polyolefins, polypropylene, polyethylene, polyamides, poly(tetrafluoroethene), polyvinylidene chloride, polystyrene, polyisobutylene, polybutadiene, polyurethanes, elastomers, and copolymers and mixtures thereof. A particularly preferable porous core is one where the sorbent is NaY and the polymer is cellulose acetate and wherein the sorbent comprises at least 70% by weight of the fiber based on total dry weight.

Sheath

The sheath often serves to protect the components of the porous core, e.g., sorbent and/or polymer, from conditions that may harm one or more of the components. Such conditions may include, for example, high temperatures, pressures, or corrosive chemicals. In this manner, the porous core can be used to sorb an impurity and then the fiber can be regenerated in a convenient manner, for example, temperature swing, pressure swing, or a combination thereof without significant damage to the core components. More specifically, in for example, a temperature swing regeneration employing steam or another fluid, the sheath prevents the steam or other fluid from entering the porous core and hindering the capacity of the sorbent. In addition, when diffusing methane or other gas through a porous core of the fiber the sheath assists in preventing the methane or other gas from escaping.

The sheath preferably surrounds the exterior, is uncapped, and usually characterized by a heat resistance of at least about 50, preferably at least about 80, more preferably at least about 110° C. and by one or more to any and all combinations of any of the following parameters which are measured with the composition and amounts of the sheath in a film form:

(1) a water vapor transmission rate (WVTR) of less than about 50, preferably less than about 25, preferably less than about 10, preferably less than about 3 Barrer at 38° C. and 90% relative humidity; or (2) an $O_2$ permeability of less than about 10, preferably less than about 3, preferably less than about 0.5, preferably less than about 0.02 Barrer; or (3) an $N_2$ permeability of less than about 1, preferably less than about 0.7, preferably less than about 0.005 Barrer; or (4) a CO2 permeability of less than about 20, preferably less than about 5, preferably less than about 0.5, preferably less than about 0.1 Barrer.

Permeability for films is often measured using Barrer units while permeability for fibers is often measured in Gas Permeation Units (GPU). As one skilled in the art understands 1 (Gas Permeation Unit (GPU)=$1.0 \times 10^{-6}$ cm$^3$ (STP)/ (cm$^2$.sec.cmHg) and 1 Barrer=$1.0 \times 10^{-10}$ cm$^3$ (STP).cm/ (cm$^2$.sec.cmHg). The conversion factors are as follows:

$$\text{Permeability Coefficient } (P) = \frac{1.0(\text{cm}^3 STP)(\text{mil})}{(24 \text{ hrs})(100 \text{ in}^2)(\text{atm})}$$

$$= 6.00 * 10^{-13} \frac{(\text{cm}^3 STP)(\text{cm})}{(\text{sec})(\text{cm}^2)(\text{cm } Hg)}$$

$$= 3.94 * 10^{-1} \frac{(\text{cm}^3 STP)(\text{mm})}{(24 \text{ hrs})(\text{m}^2)(\text{atm})}$$

$$= 2.68 * 10^{-17} \frac{M(gm)(\text{cm})}{(\text{sec})(\text{cm}^2)(\text{cm } Hg)}$$

$$\text{Water Vapor Transmission Rate } (WVTR) = \frac{1.0(gm)(\text{mil})}{(24 \text{ hrs})(100 \text{ in}^2)}$$

$$= 1.02 * 10^{-6} \left(\frac{1}{Mp}\right) \frac{(\text{cm}^3 STP)(\text{cm})}{(\text{sec})(\text{cm}^2)}$$

Where M is the molecular weight of the permeating gas or vapor and p is the partial pressure gradient across the film. For water vapor at 38° C. and 90% Relative Humidity (RH)

$$\text{Permeability Coefficient } (P) = \frac{1.0(gm)(\text{mil})}{(24 \text{ hrs})(100 \text{ in}^2)}$$

$$= 1.15 * 10^{-8} \frac{(\text{cm}^3 STP)(\text{cm})}{(\text{sec})(\text{cm}^2)(\text{cm } Hg)}$$

The sheath thickness, as well as, the components and their amounts may vary depending upon the materials employed, the desired application and method of making. Generally, the sheath has an average thickness of from about 0.1 to about 100 microns. The sheath may comprise one, two, or even three or more layers. The predominant component of the sheath is typically a polymer. If two or more fibers are to be in close proximity (as in the case when fibers are substantially aligned in a module as described above), then it is usually preferred that the polymer not be too tacky such that the fibers agglomerate. Agglomerated fibers may tend to make it difficult to form the module and also may hinder heat and mass transfer when the module is employed. Useful polymers may include those selected from the group consisting of polyethylene terephthalate, polyvinylidene chloride, polyimide, polyacrylonitrile, polyester urethane, neoprene, polyether amide block co-polymer and mixtures thereof. A particularly preferred sheath comprises polyvinylidene chloride wherein the $N_2$ permeance is less than 5 (GPU) at 30 psig. This sheath has been found particularly useful in combination with the porous core where the sorbent is NaY and the polymer is cellulose acetate and wherein the sorbent comprises at least 70% by weight of the fiber based on total dry weight.

Process of Dual Layer Spinning and Corresponding Dope Compositions

The previously described fibers may be made in any convenient manner. For example, the porous core and sheath may be spun simultaneously in a dual or multi-layer spinning process. Such processes are described in detail in the examples below. If this manner is employed, then a suitable core dope composition and suitable sheath dope composition is required. Core dope compositions are described in, for example, WO 2009/003171 and WO 2009/003174 which portions are incorporated herein by reference to the extent that they are not inconsistent with the instant application. These core dope compositions may be modified and used, for example, in accordance with the conditions described in the examples below.

The sheath dope composition may, of course, vary depending upon the desired properties of the sheath, as well as, the spinning parameters to be employed. A particularly useful composition suitable for making a sheath on a fiber in a multi-layer spinning process comprises a polyvinylidene chloride and solvent that is miscible with whatever solvent(s) being employed in the core dope composition. This assists in adhering the porous core and sheath together. Useful solvents may include a dipolar aprotic solvent such as those selected from the group consisting of N-methylpyrrolidone, dimethylformamide, dimethyl acetamide, DMSO, tetrahydrofuran, toluene, and mixtures thereof. Other solvents that may prove useful depending upon the polymer include, for example, hexamethylphosphoramide, tetramethylene sulfoxide, N-acetylpiperidine, N-formylhexamethylene imine, and trimethylene sulfide.

The amount of polyvinylidene chloride varies with solvent and spinning conditions but generally comprises at least about 15, or at least about 25, or least about 30 weight percent based on the total weight of the composition up to about 45, or even up to about 60 weight percent based on the total weight of the composition. One particularly useful composition comprises from about 15 to about 60 weight percent polyvinylidene chloride and from about 40 to about 70 percent by weight N-methylpyrrolidone based on the total weight of the composition.

If a more impermeable sheath is desired, then a small amount of volatile solvent(s) like tetrahydrofuran, acetone, n-heptane or a mixture thereof may be added to the sheath dope composition. It has also been discovered that the presence of water may contribute to somewhat rapid and undesirable phase separation. Accordingly, preferred sheath dope compositions comprise from about 0 to about 2, preferably less than about 1, weight percent of water based on the total weight of the composition. Alternatively, ethanol, acetic acid, propionic acid or another weak non-solvent or mixture thereof can be added in small amounts, e.g., from about 1 to about 5 wt %, in the sheath dope as a weak non-solvent as a replacement of water.

Process of Spinning Core Dope and Creating Sheath in a Post-treatment Step

If desired, the previously described fibers may be made by spinning a fiber comprising only the porous core and then creating the sheath in a convenient manner. Post-treatment of such fiber sorbents are described in detail in the example below entitled "post treatment of fiber sorbents."

Applications

The fibers described herein may be used in a wide variety of applications including removing contaminants like volatile organic compounds and sulfur compounds from liquid or gas fuels. A particularly useful process is for reducing the amount of one or more low level contaminants of a gas stream. Such a process usually comprises step (a) contacting the gas stream comprising an initial concentration of one or more low level contaminants with one or more fibers which comprises a porous core and a sheath surrounding said porous core. The core comprises a sorbent and a polymer and wherein the sheath is characterized by a heat resistance of at least about 110° C. and one or more of the following:

(1) a water vapor transmission rate (WVTR) of less than about 50, preferably less than about 25, preferably less than about 10, preferably less than about 3 Barrer at 38° C. and 90% relative humidity; or (2) an $O_2$ permeability of less than about 10, preferably less than about 3, preferably less than about 0.5, preferably less than about 0.02 Barrer; or (3) an $N_2$ permeability of less than about 1, preferably less than about 0.7, preferably less than about 0.005 Barrer; or (4) a CO2 permeability of less than about 20, preferably less than about 5, preferably less than about 0.5, preferably less than about 0.1 Barrer wherein said contacting is conducted in a manner such that the initial concentration of one or more low level contaminants in the gas stream is reduced by sorption of said low level contaminant on said sorbent. Next, in step (b) the one or more fibers may then be regenerated by passing a regenerating fluid which has a temperature of at least about 50° C. over the sheath layer of said fiber in a manner such that the fluid does not contact the porous core. Steps (a) and (b) may repeated two, three, or even multiply more times in a continuous or cyclic process of absorbing contaminants from a feed stream and then desorbing the contaminants from the sorbent to regenerate it. In another embodiment at least a portion of the initial concentration of one or more low level contaminants may be recovered. The recovered contaminants may be disposed of or recycled for another use, e.g., recovered sulfur compounds may be reused by natural gas producers.

The gas stream may comprise one or more gases or mixtures. Useful gas streams include those selected from natural gas, a petrochemical stream, city gas, diesel fuel, gasoline, LPG, jet fuel, a reformate gas, naptha and mixtures thereof. Such a stream often may contain one or more compounds comprising sulfur which are added as odorants but may be a contaminant if the gas stream is to be used in, for example, a fuel cell. The instant process may be useful when the initial concentration of the compounds comprising sulfur is from about 5 to about 1000 ppm or even higher. Advantageously, the contacting of these compounds with the sorbent one or more times during the process may reduce this initial concentration of the compound comprising sulfur to a concentration of less than about 1 ppm. Advantageously, the gas stream with the reduced amount of low level contaminates may then be used as a fuel in, for example, a fuel cell or a steam-methane reforming unit.

The regenerating step is used to desorb the one or more contaminants from the sorbent material. The regenerating fluid may be any convenient media such as a liquid or gas which is capable of regenerating the sorbent material of the porous core. Such fluids include those having a temperature of at least about 50° C. and conveniently may comprise steam, hot water, a gas, or a mixture thereof in many applications. If the regenerating media is, for example, a dry flue gas or a purge gas like nitrogen or methane, then it may be possible to employ a single layer fiber sorbent without a barrier layer without significant loss of sorption capacity. In some embodiments, the regenerating step may be accomplished in less than about 2, or less than even about 1 minute for large amounts of contaminants.

Exemplary TSA Cycle

One TSA cycle that may be particularly useful comprises feeding sulfur gases to the tube side of a module during an adsorption cycle. Sulfur compounds sorb into the adsorbents located in the fiber sorbent morphology and a purified stream is emitted. The gas flow rate in this step may be between 80-300 cc/min. When the sulfur compounds breakthrough, the outlet stream concentration reaches as low as 1 ppm sulfur compound. Due to the low concentration of sulfur compounds, there may be only a slight to no increase in the module temperature. If too large a temperature increase is observed due to heat of adsorption, then cooling water may be supplied to lower the temperature.

During the regeneration step, steam at a relatively constant temperature may be supplied on the shell side to heat the modules. Simultaneously, a nitrogen/methane sweep is applied through the fiber bore to effectively displace a substantial amount of the desorbed sulfur compounds and remove any trace amounts of water vapor which might have permeated through the sheath layer. The flow rate of nitrogen sweep may be varied depending on the process requirements. A high flow rate usually improves desorption but can lead to a dilute desorbed phase. The heating may be stopped when the sulfur outlet concentration reaches 1 ppm or less indicating the completion of the regeneration cycle.

As an alternative to steam, a small amount of a substance such as natural gas could be burned to heat up a natural gas stream to be used as a hot purge gas. Hot natural gas purge may be especially useful in small scale operations. In this manner, an initial natural gas purge would be first passed through the bed to collect a sulfur odorant concentrated stream. Next, a desulfurized natural gas purge can be passed to dry the bed. Any water vapor picked up in the desulfurized natural gas purge is generally acceptable since the next step is typically a steam-methane reforming reaction and water gas shift reaction where the natural gas will be contacted with water/steam.

Depending on the specific materials and process, it may be desirable to control the humidity level during regeneration. In this manner, the sorbent may be protected against finite permeance or water flux. For some sorbents such as hydrophilic and/or high silica zeolites like NaY or NaX, a purge of natural gas may be useful to maintain an appropriate humidity level during regeneration.

Next, if desired the fibers may be cooled by water at an ambient temperatures (~25° C.) before the start of the next adsorption cycle. The flow is usually stopped when the average temperature difference between the fibers and the cooling water reaches a certain value, e.g., 5 K.

Unless specifically defined otherwise, all technical or scientific terms used herein have the same meaning as commonly understood by one of ordinary skill in the art to which this invention belongs. Although any methods and materials similar or equivalent to those described herein can be used in the practice or testing of the present invention, the preferred methods and materials are better illustrated by the use of the following non-limiting examples, which are offered by way of illustration and not by way of limitation.

The following examples are presented to further illustrate and explain the claimed subject matter and should not be taken as limiting in any regard.

EXAMPLES

Fiber Sorbent Core Dope Preparation in General

Fiber sorbent dopes are usually made close to a two phase binodal curve as shown in FIG. 1 to facilitate faster phase separation and higher porosity. Dopes in smaller quantities, e.g., 15 ml, may be made by varying solvent, non-solvent and zeolite composition to determine one and two phase regions using the cloud point technique described in, for example, Kosuri, M. R. and W. J. Koros, *Defect free asymmetric hollow fiber membranes from Torlon®, polyamide-imide polymer, for high-pressure CO2 separations*. Journal of Membrane Science, 2008. 320(1-2): p. 65-72.

A dried pore former such as Polyvinyl Pyrrolidone (PVP) is dissolved in a solvent such as N-Methyl-2-Pyrrolidone (NMP) in a 1000 ml glass container using a sonication bath (Model 1510R-MTH, Branson Ultrasonics, Danbury, Conn.). After PVP is completely dissolved, a sorbent, e.g., zeolite NaY (Zeolyst CBV-100, Valley Forge, Pa. with average particle size of about 500 nm and Si/Al ratio of about 2.5), is added in three parts with sonication by a 1000 Watt horn (Dukane, Leesburg, Va.) twice in one minute bursts for every part added. The sonication horn assists in ensuring the complete dispersion of particles in the solvent solution so as to avoid clumping of zeolite particles which can cause clogging of the spinneret during the spinning process. Non-solvent (DI water) is added to the dope next. A dried polymer 'binder' such as cellulose acetate (CA) (($M_n$~50,000, Sigma-Aldrich, Milwaukee, Wis.) and/or Polyester Urethane (Estane™, grade 58226 from Lubrizol, Cleveland, Ohio) is then slowly added to the fiber sorbent dope. Polymer is generally added after the dispersion of sorbent because the dissolution of the polymer often enhances the viscosity of the dope and higher viscosities may cause difficulty in the dispersion of zeolite particles.

The dope is sealed, heated to a temperature of 45-50° C. and stirred using a high torque motor (Model 409, TalBoys laboratory stirrers, Troemner LLC, Thorofare, N.J.) with an anchor-gate type impeller. The dispersion is stirred for 12-24 hours to ensure complete dissolution of the polymer.

Sheath Dope Preparation in General

A sheath dope is prepared when formation of a barrier layer is desired by co-extrusion with fiber sorbent dope using, for example, a dual layer spinneret. A solvent, e.g., NMP, is taken in a 1000 ml glass jar. Dried polymer, e.g., polyvinylidene chloride (PVDC), is then slowly added to the desired polymer concentration. The dispersion is sealed and stirred for 12-24 hours using a high torque motor and impeller as described above for core dope creation. The dope is then poured into a syringe pump (Model 500 DM, Teledyne Isco, Lincoln, Nebr.) and kept undisturbed for about 12-24 hours to ensure complete degassing of the dope solution.

Fiber Spinning in General

Fiber sorbents may be made using the dry-wet solution spinning technique illustrated in FIG. 2. Sorbent, e.g., zeolite, suspended polymer solution or 'dope' is fed by a syringe pump (Model 500 DM, Teledyne Isco, Lincoln, Nebr.) into a syringe pump for spinning. The pump barrel is heated to 50° C. and kept undisturbed for about 12-24 hours to ensure complete degassing of the dope. Air bubbles trapped in the dope can cause pressure fluctuations during spinning leading to the creation of defective fiber sorbents.

Simultaneously, an approximately thermodynamically neutral solution of a mixture of solvent and non-solvent, referred to as the bore fluid, is fed into the spinneret. If a sheath is to be created using multi-layer, e.g., dual-layer, spinning then sheath dope is also fed into a syringe pump (Model 500 DM, Teledyne Isco) and kept undisturbed for about 12-24 hours prior to spinning to ensure complete degassing of the dope solution. The extruded nascent fiber then passes through an adjustable air gap before entering a quench bath where it phase separates and vitrifies. Water is used as an environmentally friendly and easily available quench bath medium. The fiber then passes under a TEFLON™ guide and is collected on a rotating take-up drum. The extrusion rate, speed of take-up, and/or the size of the annular die are often factors in the diameter of the fiber. The fiber morphology may be controlled by varying spinning conditions such as air gap height, humidity, operating temperature, quench bath composition, quench bath temperature, dope and/or bore fluid compositions.

The fibers are removed from the drum and then soaked in de-ionized (DI) water for 3-4 days, changing with fresh DI water daily. After this, the water present in the fiber substructure is solvent exchanged by immersion for 30 minutes each in three batches of fresh methanol followed by three batches of fresh hexane. The solvent exchange process assists in removing high surface tension liquids before the drying step and decreases capillary forces that could cause fiber pores to degrade or collapse. The residual hexane may be removed by keeping fibers at room temperature for 1 hour and then drying them under vacuum at 80° C. for another hour.

Single Layer Fiber Spinning Using CA and Estane™

Typically a high loading of sorbent, e.g. zeolite, loading with high strength is preferred along with a high take-up rates and ambient temperature spinning conditions for efficency.

Various fiber sorbent dopes are employed. A fiber sorbent dope composition is determined using cloud point technique with a dope composition of 12.5 wt. % CA, 42.5 wt. % NMP, 1.9 wt. % PVP, 5.6 wt. % water and 37.5 wt. % zeolite NaY. This corresponds to about 75 wt. % zeolite NaY loading (dry fiber wt. basis). The dope composition gives relatively fast phase separation of the dope even at high loadings. Bore fluid composition ratios of 80/20, preferably 70/30 to 50/50 wt. % NMP/water is a 'neutral' bore fluid often providing a relatively uniform circular bore while preventing the formation of an internal skin layer.

A deep quenching bath (e.g., 3-4 feet in depth) with water as external coagulant is used to achieve efficient phase separation of the extruded fiber. The quenching bath temperature is typically varied from around 25° C. to 50° C. A higher quench bath temperature often gives higher porosity because of faster phase separation of the fiber sorbent dope. To provide almost instantaneous phase separation of the dope and to avoid skin layer formation, the air gap may be kept low (~1-3 cm).

Fiber sorbents with Estane™/NMP/water/zeolite NaY ratio of 13.5/58.2/8/20.3 wt. % composition are also spun. This corresponds to a 60 wt. % zeolite NaY loading (dry fiber wt. basis). Estane™ showed a tendency to stick to itself and other spinning apparatus like the quench bath and the take-up drum. It also softens on exposure to high temperatures up to 120° C. Accordingly, appropriate measures may need to be taken when using these types of materials.

The CA fibers are compared to the Estane™ fibers by SEM using a 10-20 nm thick gold sputter coating. SEM images at FIG. 3 indicate that CA/NaY fiber sorbents have a desired sieve-in-a-cage structure, while Estane™ fiber sorbents indicate a sieve encapsulated by polymer ('occluded' sieve). A higher rate of permeation (gas permeation units GPU) is obtained for the CA fibers compared to the Estane™ fibers. Both fibers have close to the desired Knudsen selectivity due to high loading of sorbents as shown below. The permeance is expected to vary over the range depending upon the specific spinning conditions employed to make the fiber.

| Spin State | Permeance(P/L) $N_2$ (GPU)@30 psi | (Selectivity ($\alpha$) Measured $N_2/O_2$) |
|---|---|---|
| Estane | 500-1000 | 1.1 |
| CA | 20,000-110,000 | 1.08 |

The permeance of the fiber often depends on the type of polymer used and the morphology in the fiber. The permeance value may also be changed based on the spinning conditions as well. For a single layer fiber a high permeance value is often desired in order to provide a porous core for ease of diffusion of gas. It has been found that a lower polymer concentration in the fiber typically causes a higher permeance.

The permeance may also be affected by the bore fluid. For example, a solvent neutral bore fluid of NMP/Water ratio of around 80/20 to 70/30 provided no inner skin layer in the fiber. In contrast, a higher amount of water in the bore fluid, e.g. around 50/50 wt %, caused an inner skin layer and a lower permeance in the CA fiber sorbent. In sum, the permeance value for CA fiber sorbents were found to vary from about 20,000 GPU for a less porous fiber to about 110,000 GPU for a really porous fiber while that of an empty module (with no fibers) can be around 250,000 GPU's.

Dual or Multi-Layer Co-Extrusion Fiber Spinning

The core and sheath of the fibers may be made in a dual layer spinning process. Dual layer fibers with core layer dope composition comprising CA as noted above and sheath layer composition of PVDC (Ixan®)/NMP/water 25/72/3 wt. % may be spun successfully. NMP is miscible with the fiber sorbent core dope which also contains NMP as the solvent. SEM images of the fibers show good adhesion between the core and the sheath. Macrovoids can be observed in the sheath. An examination of the horizontal cross section of the fiber indicates uniform covering of the dual-layer fiber sorbent. SEM images of single and dual layer fiber sorbents are shown in FIG. 4. Specifically, the first row of images in FIG. 4 are single layer fiber sorbent with cellulose acetate and zeolite NaY. The second row of images are dual layer fiber sorbent with 25 wt % PVDC polymer content in the sheath (core layer same as single layer fiber sorbent). The third row of images are dual layer fiber sorbent with 45 wt % PVDC polymer content in the sheath (core layer same as single layer fiber sorbent).

While not wishing to be bound by any theory, it is believed that the macrovoids might arise due to low dope viscosity and/or low draw ratios during spinning. Accordingly, if one wishes to avoid macrovoids, the sheath dope viscosity may be increased by, for example, increasing the polymer concentration. Also, to avoid somewhat instantaneous phase separation in the sheath, it may be beneficial to reduce the amount of water in the dope composition. Accordingly, another sheath dope composition comprises a PVDC/NMP ratio of 45/55 wt. %.

The draw ratio also affects the preparation of the fibers. Draw ratio can normally be increased by, for example, lowering the extrusion rate or by increasing the take up rate. Specifically, the draw ratio is increased while the air gap is increased to about 5-10 cm to assist in allowing better interaction of the core and the sheath polymer chains before phase separation in the quench bath. The water content of the bore fluid is changed to a NMP/water ratio of 50/50 wt. % or even 70/30 wt. % to improve the phase separation of the core layer of the fiber while still avoiding the formation of an internal skin layer. The core layer and sheath layer are well adhered and macrovoids are eliminated from the sheath structure. While not wishing to be bound by any theory it is possible that hydrogen bonding between the chlorine groups in PVDC and the hydrogen groups present in cellulose acetate contribute to the adhesion. The specific details of the compositions and spinning conditions are summarized below.

| Component | Cellulose acetate core dope (wt. %) | PVDC sheath dope (wt. %) |
|---|---|---|
| CA | 12.5 | N/A |
| PVDC | N/A | 45 |
| NMP | 42.5 | 55 |
| Water | 5.6 | — |
| PVP | 1.9 | — |
| Zeolite NaY | 37.5 | — |

| Spinning parameter | Range |
|---|---|
| Core flow rate (ml/hr) | 180-600 |
| Sheath flow rate (ml/hr) | 60-300 |
| Bore flow rate (ml/hr) | 60-300 |
| Air gap (cm) | 1-10 |
| Take-up rate (m/min) | 10-25 |
| External coagulant | Water |
| Bore fluid (internal coagulant) | 80/20 to 50/50 wt. % (NMP/Water) |
| Coagulation bath temperature (° C.) | 25-50 |

It is found that the aforementioned spinning dope compositions and spinning conditions result in a porous core structure of fiber sorbent with a relatively dense and relatively impermeable sheath. If lower porosities are desired, then it may be beneficial to modify the conditions to cause slower phase separation in the core layer.

The PVDC dope solution indicates shear thinning properties. Typically, the dope experiences shear action in spinneret. An increase in temperature assists in reducing the viscosity of the dope. With low shearing the solution may become viscous due to perhaps a strong interaction of pendant groups with each other.

If a denser and more impermeable sheath layer is desired then the sheath dope may be modified to include THF as a low boiling point solvent in the dope. THF substantially vaporizes in the air gap while spinning and contributes to a denser sheath layer. Depending upon the other ingredients and process conditions, the NMP/THF ratio may be varied from about 6:1 to about 2:1 in the spinning dope with a ratio of 4:1 being particularly useful.

A quench bath temperature of around 25° C. was found to give good adhesion between the core and the sheath layer. A quench bath temperature of around 50° C. was observed to give poor adhesion between the two layers, possibly due to the rapid phase separation of the sheath layer compared to the core layer.

Post Treatment of Fiber Sorbents

A post treatment method may be used to further strengthen a fiber with an existing sheath prepared in, for example, a multi-layer spinning process. Such a post-treatment may be useful to, for example, remove or correct any defects in the sheath. Alternatively, a post treatment may be used to add a sheath to, for example, a single layer fiber sorbent such as the Estane™ or CA fibers made in the single layer fiber spinning example above. First, a single or dual layer fiber can be spun as described above. Next, solvent exchanged and dried fibers are exposed to a suitable material such as latex, e.g., Polyvinylidene chloride (PVDC), in an aqueous dispersion solution.

Spray and dip coating methods may be employed so long as fine control is employed during immersion and withdrawal of the fibers so as to avoid cracked coatings due to unstable removal during withdrawal of fibers. It may be useful to treat fibers individually depending upon the specific composition of the fiber and aqueous dispersion solution.

As an alternative to spray or dip coating, a method using, for example, a module design may be employed. In this method, fiber sorbents are potted into a module with, for example, a shell and tube geometry. Modules are clamped in a vertical position to facilitate ease of flow and rapid draining of the post treatment solution. A Polyvinylidene chloride (PVDC) (dispersion grade Diofan® XB-201, Solvay Advanced Polymers, Alpharetta, Ga.) solution is passed on the shell side at a substantially constant rate from a syringe pump while nitrogen at a substantially constant pressure is passed on the bore side. The post treatment setup and protocol is illustrated in FIGS. 5-6.

In a specific example, a Polyvinylidene chloride (PVDC) (dispersion grade Diofan® XB-201, Solvay Advanced Polymers, Alpharetta, Ga.) latex solution is diluted from 55 wt. % solids to 10-15 wt. % solid content by the addition of DI Water. Dilution may assist in reducing viscosity, enabling rapid and adequate spreading of the coating liquid through a fiber module. Porosity in a fiber may cause greater thickness of coating due to capillary suction of the coating solvent into the fiber wall. Fibers are pre-wetted with DI water to reduce the coating thickness. The average particle size of PVDC particles in the solution is generally from about 50 to about 140 nm, while the size of the pores in fiber sorbents is approximately 0.3-1 µm. Pressure difference is maintained from the interior to the exterior of the fiber sorbents to prevent the PVDC dispersion from being pulled into the porous fibers and blocking the pores. This may be conveniently accomplished by a $N_2$ flow through the fiber bore such that it does not allow the dispersion to get into the pores or blow up the post treatment coating. The pressure difference may be calculated using the following equations:

$$\text{Pressure drop } (\Delta P) = \frac{2\sigma\cos\Theta}{(r)}$$

Interfacial tension $(\gamma) = 33 \ mN/m$

Contact angle $\Theta = 33^0 - 40^0$

Pore size $r \approx 500 \ nm$ $$\Delta P = \frac{2 * 33 \ mN/m * \cos 40^0}{(500 * 10^{-9} \ m)} 1 \ atm$$

Flow rate of the diluted Diofan® solution is maintained at ~100 ml/min. This flow rate insures nearly complete wetting of fibers in the module. Inlet and outlet valves on the shell side are then closed for 10-15 minutes to allow filling of the module with Diofan® solution to get higher contact time between the fibers and the PVDC particles. The coating liquid solution is then drained out. These steps may be repeated until reaching the desired level of coating thickness and quality of coating. The fibers module is then purged with $N_2$ gas at a flow rate of 300 ccm on the shell side for 12 hours to remove trace amounts of water present in the coating. The fiber module is then heated at around 100° C. to dry the fiber coating. SEM-EDX on the post treated fibers confirms that the core is not blocked by the PVDC particles and that the CA/NaY in the core layer is not in the sheath layer.

The fibers should not be dried too rapidly after passing the post treatment solution in order to avoid cracks on the surface of the fibers. To reduce cracks a $N_2$ purge at ambient temperatures through the fiber module for about 12 hours before drying the fibers at 100° C. may be employed.

If multiple fibers are to be post-treated, then it may be desirable to somehow cause repulsion amongst the fibers to reduce and/or avoid clumping during the process. Charging the fibers may be beneficial in this regard. Alternatively or additionally, the sheath polymer, e.g., PVDC, may be suspended in a non-polar organic base like hexane for easier drying and reducing stickiness of the coating on the fibers.

Permeation Experiments

Gas permeation experiments are performed on fiber sorbents with barrier layer and compared with single layer fiber sorbents. Fiber modules are made and tested using the constant pressure method as described in, for example, Pesek, S. C. and W. J. Koros, *Aqueous Quenched Asymmetric Polysulfone Hollow Fibers Prepared by Dry Wet Phase-Separation.* Journal of Membrane Science, 1994. 88(1): p. 1-19. Pure oxygen and nitrogen are used and permeance is tested at 35° C. The results are shown below.

| Module No. | P/L (GPU) ($N_2$) At 30 psig | Measured Selectivity $\alpha$ ($N_2$/$O_2$) |
|---|---|---|
| Single Layer Fiber sorbents | 20,000-110,000 | 1.08 |
| Post treated fiber sorbents | 2 | 1.1 |
| Dual layer co-extruded fiber sorbents | 4-10 | 1.4 |

It was discovered that the value of a single layer fiber sorbent could be made to vary from 20,000 GPU to 110,000 GPU's. Typically, for most applications a higher GPU is better in the case of a single layer fiber sorbent. In the case of dual layer fiber sorbent the lowest value achieved was about 4 GPU. It was found that if the impermeable sheath layer is either defective or not well adhered to the core layer, then a very high value approaching that of a single layer fiber sorbent may result.

As shown by the data above, the presence of a PVDC barrier layer on the sheath side of the fiber sorbent reduces the $N_2$ permeance. These relatively low permeance values do not approach the barrier properties indicated by pure PVDC films. The intrinsic selectivity of the fibers above indicates the presence of pin-holes which may or may not be advantageous depending upon the desired application. If desired, further steps such as a post-treatment may be undertaken to remedy pinhole defects.

Equilibrium Sorption

Equilibrium sorption using a quartz spring method as described in, for example, McBain, J. W. and A. M. Bakr, *A new sorption balance.* Journal of the American Chemical Society, 1926. 48(1): p. 690-695 is useful to determine the sorption capacity of particles, pure polymer fibers and fiber sorbents. Equilibrium sorption is performed to determine the capacity of fiber sorbents for a compound comprising sulfur, i.e., tertiary butyl mercaptan (TBM). The capacity is compared with the capacity of pure zeolite NaY and the capacity of a pure polymer cellulose acetate hollow fiber. Equilibrium sorption on as received zeolite NaY indicated high affinity for TBM with saturation capacity of 1.14 mmole/gm NaY. The sorption data indicated type-I isotherm and is fitted to the Langmuir model as is known in the art. CA hollow fiber sorption data indicates less sorption capacity for TBM compared to that of zeolite NaY. This data is fitted to the dual mode model as is known in the art. The equilibrium isotherms of pure TBM on fiber sorbents and its individual components is shown in FIG. 7.

As shown in the figure CA/NaY fiber sorbents yield a capacity which is substantially the same as the values predicted by adding the capacities of undried pure polymer and undried pure zeolite based on their loadings in the fiber sorbent. This indicates that the zeolite particles are accessible to the compound comprising sulfur. Also, sorption and desorption curves show reversible physisorption indicating the regenerability of the fiber sorbents. In actual natural gas (NG) feed conditions the partial pressure of sulfur odorants in NG are often less than 10 mm Hg. Even at these partial pressures the zeolites and the fiber sorbents indicate relatively high sorption capacities showing that zeolite NaY is a useful adsorbent to trap TBM odorant from natural gas.

Transient Sorption

Transient sorption is used to determine the diffusion coefficient in fiber sorbent morphologies. Highly porous fiber sorbent morphology ideally gives diffusion coefficients of the same order as a pure sorbent. Kinetic measurements using the quartz spring verify extremely rapid equilibration but cannot be quantified because of the short time scale of sorption.

A pressure decay sorption method is useful to determine the sorption kinetics of pure zeolite NaY particles and single layer fiber sorbents. The method is described in detail in Koros, W. J. and D. R. Paul, *Design Considerations for Measurement of Gas Sorption in Polymers by Pressure Decay*. Journal of Polymer Science Part B-Polymer Physics, 1976. 14(10): p. 1903-1907. Due to the low odor thresholds of pure TBM vapor, iso-butane $C_4H_{10}$ ($\sigma \approx 5.2$ Å) is chosen as a surrogate gas for transient sorption because of its similar size to that of TBM $C_4H_{10}S$ ($\sigma \approx 6$ Å). Their diffusion coefficients are expected to be of similar orders of magnitude. This system is a batch system which can be used for pure gases. Neo-Pentane ($C_5H_{12}$) ($\sigma \approx 6.4$ Å) can be used as a surrogate as opposed to iso-butane.

From the uptake curve at FIG. 8 it is found that the diffusion of gas molecules in pure NaY particles and porous CA-NaY fiber sorbents are comparable. The half times (~1 sec) in both the cases indicate relatively fast diffusion of gas.

Temperature Swing (TSA) Capability

A facility is designed to measure sulfur concentration under flow conditions and provide saturated steam for the regeneration of modules. The gases are 35 ppm $TBM/N_2$ and 35 ppm $H_2S/N_2$ as test gases and Nitrogen (UHP grade, Airgas Atlanta, Ga.) as a purge gas. Nitrogen ($\sigma \approx 3.798$ Å) is used as a surrogate for methane ($\sigma \approx 3.758$ Å) because of its similar molecular size to methane and ease of availability in dryer backgrounds. High temperature TEFLON™ tubing (⅛" O.D., 1/16" I.D., McMaster Atlanta, Ga.) is used to prevent contamination by sulfur gases. The sulfur gases pass through a phosphorous pentaoxide ($P_2O_5$) desiccant trap to remove trace amounts of water vapor in the gas. The sulfur gases are then passed through a flow controller (Model FMA-A2305-SS, Omega engineering Inc., Stamford, Conn.) to obtain a desired flow rate of 0-500 cc/min. The apparatus is designed to allow the sulfur gas concentration to be further diluted by the addition of nitrogen as desired. The stream can then flow through the module or bypass it during calibration.

A fiber sorbent module is made with a 35.2 cm long stainless steel tubing with a shell and tube module design as described in, for example, Carruthers, S. B., G. L. Ramos, and W. J. Koros, Morphology of integral-skin layers in hollow-fiber gas-separation membranes. Journal of applied polymer science, 2003. 90(2): p. 399-411 and Carruthers, S., Integral-skin formation in hollow fiber membranes for gas separations, in Department of Chemical Engineering, University of Texas at Austin. 2001. The fiber sorbent modules may be made with a ¼ inch or ½ inch tubes and fittings to study effects of scale-up. In the case of comparative studies with zeolite packed beds, zeolite NaY particles are packed in a fritted glass tube (½ inch O.D., wall thickness 1/32 inch, bed depth 1-2 cm). Before each adsorption run the modules are heated to 120° C. using heating tapes (Briskheat™, Barnstead International, Dubuque, Iowa) regulated by a temperature controller (Model: EW-02155-52, Cole-Parmer Inc. Vernon Hills, Ill.) for 12-36 hours on the test rig under a nitrogen purge to remove trace amounts of water vapors sorbed in the beds. Before each run, averages of 4-5 readings are taken to determine the baseline concentration. The reactor is then cooled down to ambient conditions (~25° C.) and the adsorption runs are started. The gas pressure is maintained between 5-15 psig to simulate realistic pipeline natural gas conditions. The gas flow from the reactor is then passed through a needle valve (Model SS-4MG-VCR-MH, Swagelok Alpharetta, Ga.) to regulate the gas flow rate to the sulfur analyzer at 80 cc/min. After the off gas flow controller, the gas is passed though a 0.5 μm filter to remove any entrained fine particles before the sulfur analyzer.

Sample analysis is performed by a $H_2S$/total sulfur analyzer (Model 902, Galvanic Applied Sciences, Houston, Tex.). The analyzer is based on a lead acetate tape detection method. This method relies on the chemical reaction of $H_2S$ with lead acetate impregnated paper tape to form lead sulfide. Concentration of $H_2S$ can be determined by the rate of staining on the tape. The equipment is used to measure the total sulfur concentration by mixing of the sample stream with hydrogen and then passing it through a quartz tube heated to 1000° C. This process quantitatively converts the compounds comprising sulfur to $H_2S$ which are then measured at the tape. The instrument is calibrated for concentrations in the range of 0-50 ppm using pre-mixed calibration standard gases. The equipment has a lower detection limit of 0.1 ppm. The vent gases from the analyzer are purged into a fume hood.

Saturated steam is produced by means of an electric steam generator (Model: MBA 3, Sussaman electric boilers, Long Island City, N.Y.). The steam temperature can be varied between 373 K-473 K. Lab supply water is used to cool the module to ambient conditions after the regeneration cycle with steam. The flow rate of the cooling water is varied from 0-1.5 gallons per minute (gpm). Steam and water are supplied intermittently to the module during the regeneration step. The direction of heat transfer fluids is oriented from the top to the bottom of the module to assist in draining of the liquids. Ball valves are used to switch from steam to cooling water supply. The steam supply and discharge lines are insulated with fiber glass foam. Steam condensate is collected in a blowdown separator for safe discharge. J-type thermocouples and pressure gauges are at the inlet and outlet of the module on both the shell and the bore side. The temperature data is recorded using a 4-channel data logger with real time display (Model: HH 147, Omega engineering Inc., Stamford, Conn.).

Continuous temperature swing cycles are performed and the time required to heat and cool the fibers during the regeneration step is recorded. The steam generator is set to give steam at around 180° C. during the heating cycles. Cooling water at a temperature of 15° C. at a flow rate of 1.5 gpm is used during the cooling cycles. FIG. 9 depicts the feasibility of rapid continuous temperature swing cycles. FIG. 10 is a blow up view of one heating/cooling cycle. Continuous and rapid thermal cycles are feasible within a few seconds using steam for the regeneration of fiber sorbents. This is surprising and unexpected given that conventional packed beds can take hours to heat using hot purge gases and require proportionally larger beds to handle the same capacity. In addition, a much smaller auxiliary bed may be used with the fiber sorbent approach, thereby saving space and minimizing sorbent use.

A schematic diagram of the mode of operation of the lab scale setup is shown in FIG. 11 while FIG. 12 shows the layout.

Sorption Studies on Fiber Sorbents Vs. Zeolite Packed Bed

Flow experiments are performed on CA/NaY fiber sorbent modules with a mixture of 35 ppm $H_2S/N_2$ and sorption capacities are compared with pure-zeolite NaY packed bed module. Three modules of fiber sorbent spin 'DAB-13' with 75 wt. % zeolite NaY loading are tested and compared to pure NaY zeolite particles packed bed sorption as indicated in FIG. 13. Each module has a variable number of fibers and hence variable zeolite weight. The experimental conditions and the sorption capacity (assuming only zeolite NaY in the fiber sorbents contribute) are indicated in the table below. The weight of fiber sorbents is determined before potting in the modules and based on the sorbent loading, the amount of zeolite is calculated.

| Sample | Pure zeolite NaY particles | DAB-13 state 02 module 3 | DAB-13 state 01 module 2 | DAB-13 state 01 module 1 |
|---|---|---|---|---|
| Zeolite weight (gm) | 0.3 | 0.87 | 0.53 | 0.43 |
| Breakthrough capacity (mg $H_2S$/gm sorbent) | 0.2 | 0.6 | 0.7 | 0.7 |
| Saturation capacity (mg $H_2S$/gm sorbent) | 1.1 | 0.7 | 0.8 | 0.7 |

Fiber sorbents indicate a S-shaped sorption curve similar to packed bed zeolite NaY. Fiber sorbents did not indicate any premature breakthrough. In contrast, if NaY particles are packed improperly in the packed bed module premature breakthrough occurs. Saturation capacities (mg $H_2S$/gram actual zeolite) are relatively close in fiber sorbents and packed bed case indicating that the zeolite pores are not blocked. Channeling of gas through the fiber sorbents is not observed indicating relatively fast diffusion and easy access of gas to zeolites in fiber sorbent morphology. The difference between breakthrough and saturation capacities for zeolite packed bed is large compared to fiber sorbent modules. Thus, the adsorption step could be stopped once the compounds comprising sulfur outlet concentration reaches around 1 ppm, e.g., the breakthrough capacity.

Regeneration Studies on Fiber Sorbents

As described above, fiber sorbents may be rapidly regenerated using, for example, steam as the heat transfer medium. In this example, fiber sorbents (without a sheath) are regenerated by heating the modules to 125-135° C. using heat tape with $N_2$ purge gas at 200 cc/min. The sorption curves and capacity after two regeneration cycles are depicted in FIG. 14 and the table below. A cyclic steady state may usually be achieved in 2-3 cycles.

| | Cycle type | | |
|---|---|---|---|
| | first cycle | 1st regeneration | 2nd regeneration |
| $H_2S/N_2$ flow rate (ccm) | 80 | 80 | 80 |
| Breakthrough capacity (mg $H_2S$/gm sorbent) | 0.7 | 0.8 | 0.9 |
| Saturation capacity (mg $H_2S$/gm sorbent) | 0.8 | 0.9 | 0.9 |

Sorption Conditions and Results of Regenerated Fiber Sorbents

Fiber sorbents are nearly completely regenerable for $H_2S$ gas using temperature swing operation. After each regeneration cycle the breakthrough capacity and the saturation capacity increase slightly. The saturation capacity at the end of the $2^{nd}$ cycle becomes close to the saturation capacity of a zeolite packed bed. While not wishing to be bound by any particular theory this is believed to be due to the removal of relatively small amounts of water with each heating cycle, exposing more sorption sites on the zeolite.

Effect of Flow Rates on the Performance of Fiber Sorbents

To confirm the sorption of the gas into the zeolites the gas flow rate of 35 ppm $H_2S/N_2$ through the module is varied as shown below. Gas bypass and premature breakthrough is not observed at any flow rate indicating a fairly rapid radial diffusion of gas to the zeolites in the fiber sorbents. The breakthrough capacities are nearly constant with the variation of gas flow rates as shown in FIG. 15 and the data below.

| | $H_2S/N_2$ flow rate (ccm) | | |
|---|---|---|---|
| | 80 | 200 | 300 |
| Breakthrough capacity (mg $H_2S$/gm sorbent) | 0.9 | 0.8 | 0.9 |
| Saturation capacity (mg $H_2S$/gm sorbent) | 0.9 | 0.9 | 1.0 |

Using Fiber Sorbents for the Removal of Sulfur Odorants from Natural Gas

If hydrogen ($H_2$) as a fuel would become a reality as per futuristic estimates the scale of hydrogen generation can be divided into different sizes:

Central generating stations—These stations may generate up to about 1.2 million Kgs/$H_2$ per day supporting around 2 million cars. These will likely be close to refinery and scale of operations may be very high. The hydrogen distribution will likely be through pipelines.

Midsize station—Capacity of likely up to about 24,000 Kgs/$H_2$ day supporting around 40,000 cars. The distribution system will likely be cryogenic trucks or the like.

Small size stations—Capacity of likely up to 480 Kgs/$H_2$ day supporting around 800 cars. These Hydrogen stations would likely produce hydrogen at the filling station itself and would not require a distribution system.

In developing fiber sorbents for this application it is desirable to develop a natural gas desulfurization technology which can be utilized at all of the above possible stations. At present, due to the lack of distribution infrastructure and other competing alternative fuels, only the on-site filling stations have become a reality and therefore the following design is based upon that.

The calculations and equations below may be used as a guideline with the rest of the instant application as a guideline for the design and synthesis of fiber sorbents and the RTSA system as an alternative to a pellet packed bed. FIG. 19 is a block diagram showing fiber sorbents used in an on-site hydrogen generation station.

Design calculations are performed for on-site hydrogen generation station considering the feed stream conditions below. Some of the aforementioned advantages of fiber sorbents may be verified by mass and energy balances. The calculations are intended to minimize the pressure drop and maximize the mass transfer. The parameters in consideration are fiber diameter (O.D. and I.D.), fiber length, porosity of fiber and the desired zeolite loading.

Hydrogen output at the pump $Q_{mH2}$=480 kgs/day. It is considered that from the output of pure $H_2$ from the PSA unit to storage and actual dispensing the efficiency may be about 90%.

$$\text{Output from PSA unit } Q_{MPSA} = \frac{Q_{MH2}}{0.9}$$
$$= \frac{480 \text{ kgs/day}}{0.9}$$
$$= 533.3 \text{ kgs/day}$$

Based on stoichiometric calculations the amount of natural gas (NG) inlet to the steam methane reformer (SMR) unit is $Q_{mNG}$=1860 kgs/day NG. This is the natural gas that needs to be purified.

The inlet conditions of the gas are $T_{in}$=25° C. or 298 K and $P_{in}$=5 psig or 1.34 atm. Typically Dimethyl Sulfide (DMS) and Tertiary Butyl Mercaptan (TBM) are added as odorants to the NG. Typical concentrations are around 10 ppm but can be as high as 30-60 ppm. In the design calculations the concentration therefore employed is 30 ppm. Average molecular weight of NG, $M_{avg}$=17.14 kg/kmole. $T_{STP}$=273.15 K, $P_{STP}$=1 atm Determining the flow rate of the gas stream. Density at feed conditions $$\rho_{NG} = \frac{P_{in} M_{avg}}{RT_{in}} = \frac{1.34 \text{ atm} * 17.14 \text{ kg/kmole}}{0.082 \frac{m^3 \cdot atm}{K \cdot kmole} * 298 \text{ K}} = 0.94 \text{ kg/m}^3$$

$$Q_v = \frac{Q_m}{\rho_{NG}} = \frac{1860 \text{ kg/day}}{0.94 \text{ kg/m}^3} * \frac{1 \text{ day}}{24 * 3600 \text{ sec}} = 2.29 * 10^{-2} \text{ m}^3/\text{s}$$

$$\text{Flow rate } (STP) \text{ m}^3/s = Q_v * \frac{P}{P_{stp}} * \frac{T_{stp}}{T}$$
$$= 2.29 * 10^{-2} \text{ m}^3/s * \frac{1.34 \text{ atm}}{1 \text{ atm}} * \frac{273.15 \text{ K}}{298.15 \text{ K}}$$
$$= 0.028 (STP) \text{ m}^3/s$$

Dimensions of the Fiber Sorbent Module

In determining the desired dimensions of the module two approaches may be employed. 1. Fix the dimension of the module and then determine the flow velocity through the module or 2. Fix the flow velocity through the module and then determine dimension of the module. The below design uses approach 1.

With the increase in module diameter/length, for the same sorbent loading and void fractions, amount of zeolite in the module increases, increasing the breakthrough time. Based on desired breakthrough time and cost of sorbent the dimensions of the module may be varied. The dimensions of the module may be similar to a typical hollow fiber membrane module.

$d_t$=20 cm~8 inches
For sorbent beds typically,
L=6*$d_t$=6*20 cm=120 cm

The geometry of the module is cylindrical with a shell and tube type arrangement. Natural gas NG may be fed on the bore side of the fiber while steam is fed on the shell side.

$S_t = \pi/4 * d_t^2 = \pi/4 * (0.2 \text{ m})^2 = 0.0314 \text{ m}^2$

Superficial velocity through the module $$v = \frac{Q_v}{S_t} = \frac{0.0229 \text{ m}^3/s}{0.0314 \text{ m}^2} = 72.74 \text{ cm/s}$$

Volume of the module $V_t = \pi/4 * d_t^2 * L = \pi/4 * (0.2 \text{ m})^2 * 1.2 \text{ m} = 0.0377 \text{ m}^3$ Assuming the void fraction of the fiber bed $\epsilon_b$=0.4 (similar to void fraction of pellet packed bed)

Volume occupied by the fiber bed $V_f = (1-\epsilon_b) * V_t = (1-0.4) * 0.0377 \text{ m}^3 = 0.0226 \text{ m}^3$ The O.D. and I.D. of fiber sorbent are process parameters. An O.D.=800 μm, I.D.=400 μm is found to provide a high breakthrough time with less pressure drop.

Alternative O.D. and I.D. considered are summarized below.

| parameter O.D. of fiber μm | parameter I.D. of fiber μm | minimize Weight of zeolite kg | maximize Breakthrough time hours | ΔP < 0.3 atm ΔP bore side atm | No. of fibers | $\epsilon_{bh}$ |
|---|---|---|---|---|---|---|
| 1200 | 400 | 15.9 | 16.1 | 0.28 | 16,667 | 0.07 |
| 1200 | 600 | 13.4 | 13.6 | 0.06 | 16,667 | 0.15 |
| 1000 | 500 | 13.4 | 14.7 | 0.08 | 24,000 | 0.15 |
| 800 | 400 | 13.4 | 15.9 | 0.13 | 37,500 | 0.15 |
| 500 | 250 | 13.4 | 17.9 | 0.32 | 96,000 | 0.15 |
| 500 | 400 | 6.4 | 8.6 | 0.05 | 96,000 | 0.38 |

Number of fibers used in fiber bed $V_f = N*\pi/4*O.D.^2*L$ $$N = \frac{V_f}{\pi/4*O.D.^2*L}$$

$$= \frac{0.0226 \text{ m}^3}{\pi/4*(800*10^{-6} \text{ m})^2 * 1.2 \text{ m}}$$

$$= 37,500 \text{ fibers}$$

Polymer and Adsorbent Characteristics

Illustrative but not restrictive values for certain parameters are used in the calculations. The values were selected to provide similar accessibility to the sorbents in fiber sorbent and conventional packed beds.

Assume the porosity of the fibers $\epsilon_f = 0.5$ The amount of binder material in, for example, a zeolite pellet is roughly 30 wt. % of total zeolite crystal weight which is roughly 75 wt. % loading of zeolite crystals (total pellet wt. basis). In fiber sorbents, zeolite loadings in the range of 50-80 wt. % (total fiber wt. basis) are sometimes preferred. Higher zeolite loading results in brittle fiber due to smaller content of polymer 'binder' material.

Assuming 75 wt. % loading of zeolite NaY in dry Cellulose Acetate fiber (By Iterative Calculations)
Volume fraction of the adsorbent in the fibers $\phi_{ads} = 0.6$
Thus, $\Phi_{poly} = (1-\phi_{ads})*(1-\phi_{ads}) = (1-0.5)*(1-0.6) = 0.2$
$\phi_{void} = (\epsilon_f)*(1-\phi_{ads}) = (0.5)*(1-0.6) = 0.2$
Density of zeolite NaY $\rho_{ads}$ 1320 kg/m$^3$
Density of polymer cellulose acetate (CA) $\rho_{poly}$ 1300 kg/m$^3$
Hence, density of the fiber $\rho_{fiber} = \phi_{poly}*\rho_{poly} + \phi_{ads}*\rho_{ads} + \phi_{void}*\rho_{void}$
$\rho_{fiber} = 0.20*1300$ kg/m$^3$ + $0.6*1320$ kg/m$^3$ + $0.2*0$ kg/m$^3$ = 1052 kg/m$^3$
Weight fraction of adsorbent $$w_{ads} = \frac{\rho_{ads}}{\rho_{fiber}} * \Phi_{ads} = \frac{1320 \text{ kg/m}^3}{1052 \text{ kg/m}^3} * 0.6 = 0.75$$

Weight fraction of polymer $w_{poly} = 1 - w_{ads} = 1 - 0.75 = 0.25$
Volume of polymer required $V_{poly} = \phi_{poly}*N*\pi/4*(O.D.^2 - I.D.^2)*L$
$V_{poly} = 0.2*37,5000*\pi/4*((800*10^{-4} \text{ cm})^2 - (400*10^{-4} \text{ cm})^2)*120$ cm = 3392 cm$^3$
Volume of adsorbent required $V_{ads} = \phi_{ads}*N*\pi/4*(O.D.^2 - I.D.^2)*L$
$V_{ads} = 0.60*37,500*\pi/4*((800*10^{-4} \text{ cm})^2 - (400*10^{-4} \text{ cm})^2)*120$ cm = 10180 cm$^3$
Weight of adsorbent NaY added $W_{ads} = \rho_{ads}*V_{ads} = 1.32$ g/cm$^3$*10180 cm$^3$ = 13.44 kgs
Weight of the polymer required $W_{poly} = \rho_{poly}*V_{poly} = 1.30$ g/cm$^3$*3392 cm$^3$ = 4.4 kgs
Mass Transfer Considerations One advantage of faster mass transfer in fiber sorbent arises from the ability to manipulate the morphology of the sorbents as shown by comparison of various mass transfer resistances encountered by the gas, during sorption on a pellet or a fiber sorbent. The transport properties of a pellet packed bed and the novel fiber sorbent approach explain this. Commercial adsorbent particles usually consist of small microporous zeolite crystals formed into a meso/macro porous pellet with the aid of a clay binder.

In general such materials may offer following three distinct resistances to mass transfer:
1. Film transport, which involves diffusion of the solute through a hypothetical 'film' or hydrodynamic boundary layer surrounding the pellet. This external resistance is proportional to ('boundary layer'/$K_f$) which depends on the flow conditions, properties of the fluid and geometry of the adsorbent surface.
2. The meso or macro pore diffusional resistance of the pellet or the fiber.
3. Micropore resistance of the zeolite crystals in the pellet or the fiber.

Similar types of resistances exist in pellets and fiber sorbents; however the relative magnitudes of these resistances are more 'tunable' in the fiber sorbent approach. This is depicted pictorially in FIG. 16.

Better utilization of 'sorbent' sorption capacity can often be achieved with lower mass transfer resistances. Calculations are performed to determine the magnitudes of these resistances for this design.

Zeolite NaY crystal size (Grade CBV-100, Zeolyst) $d_{crystal} \approx 500$ nm (As observed under SEM). Due to the similarity in the size of tertiary butyl mercaptan and butane gas molecules their diffusivity in zeolite NaY is likely to be of similar orders of magnitude. Diffusivity of butane through zeolite NaY crystal $D_{crystal}$ 10$^{-6}$ cm$^2$/s
Intra-Crystalline Mass Transfer Coefficient $$k_{crystal} = \frac{10*D_{crystal}}{d_{crystal}} = \frac{10*10^{-6} \text{ cm}^2/\text{s}}{500*10^{-7} \text{ cm}} = 0.2 \text{ cm/s} = 0.002 \text{ m/s}$$

Calculating Binary Diffusion Between Methane (Major Component of NG) and TBM
Using Chapman-Enskog equation:

$$D_M = \frac{1.858*10^{-27}T^{3/2}}{P\sigma_{NG-TBM}^2 \Omega} * \left(\frac{1}{M_{NG}} + \frac{1}{M_{TBM}}\right)^{1/2}$$

$$D_M = \frac{1.858*10^{-27}(298.16)^{3/2}}{1.34*(4.45*10^{-10})^2*0.977} * \left(\frac{1}{17.1} + \frac{1}{90.19}\right)^{1/2}$$

$$= 1*10^{-5} \text{ m}^2/\text{s}$$

$$= 0.1 \text{ cm}^2/\text{s}$$

Tortuosity, $\tau = 3$
From SEM images of the fiber sorbents the pore sizes are roughly $r_p \approx 500$ nm
Knudsen Diffusivity $$D_k = 9.7*10^3*r_p*\sqrt{\frac{T}{M_{TBM}}}$$

$$= 9.7*10^3*500*10^{-7} \text{ cm} * \sqrt{\frac{298.15 \text{ K}}{90.19 \text{ gm/gmole}}}$$

$$= 0.88 \text{ cm}^2/\text{s}$$

Effective diffusivity $1/D_{eff} = 1(D_{TBM-CH4}*\epsilon_f/\tau) + 1/(D_k*\epsilon_f/\tau)$ $1/D_{eff} = 1(0.1 \text{ cm}^2/\text{s}*0.5/3) + 1/(0.88 \text{ cm}^2/\text{s}*0.5/3)$ $D_{eff} = 0.022$ cm$^2$/s It is usually desired that the fiber sorbent morphology be porous with interconnected pore network with the $D_{eff}$ approximately equal or at least similar to the effective diffusion (molecular+Knudsen diffusion) through the pores. If the polymer interferes or blocks the zeolite surface, the resistance may be significantly higher, i.e. $D_{eff} \approx D_{polymer}$ (~$10^{-9}$-$10^{-10}$ cm$^2$/s) which can lead to a higher macropore resistance and a smaller breakthrough time.

With a 'sieve-in-a-cage' morphology, zeolites may not be completely coated by polymer film and are usually held together in a porous mesh by the polymer. In this case the $D_{eff}$ which is the diffusion through the empty pores will be the governing diffusion through the fiber wall.

The correlation for mass transfer through the fiber wall with an insulated external surface is given by Crittenden as Intrafiber wall mass transfer coefficient $$k_{int} = \frac{2*(r_0 - r_i)*D_{eff}}{\left\{(r_0 - r_i)^2 - \left[\left(0.5 * \frac{(r_0^4 - r_i^4)}{(r_0^2 - r_i^2)}\right) - \left(\frac{4r_i}{3}\right)\frac{(r_0^3 - r_i^3)}{(r_0^2 - r_i^2)} + r_i^2\right]\right\}}$$

Substituting values, $$D_{eff} = 0.022 \text{ cm}^2/\text{s}$$

$$r_0 = \frac{O.D.}{2} = \frac{800 \text{ μm}}{2} = 400 \text{ μm}$$

$$r_i = \frac{I.D.}{2} = \frac{400 \text{ μm}}{2} = 200 \text{ μm}$$

$\Rightarrow$ Intrafiber wall mass transfer coefficient $k_{int} = 3.67$ cm/s

Yang-Cussler or Leveque equation for bore side feed in hollow fibers can be used for calculating external mass transfer coefficient (MTC)

$$Sh = 1.62 * Pe^{0.33} = 1.62 * \left(\frac{Re*Sc*ID}{L}\right)^{0.33}$$

$$Sc = \frac{\mu_{NG}}{\rho_{NG} * D_{TBM-CH4}}$$

$$= \frac{1.1 * 10^{-4} \text{ poise}}{0.942 * 10^{-3} \text{ gm/cm}^3 * 0.1 \text{ cm}^2/\text{s}}$$

$$= 1.167$$

Fraction occupied by $$\text{bore } \varepsilon_{bh} = \frac{V_{bh}}{V_t}$$

$$= \frac{N * \frac{\pi}{4} * I.D.^2 * L}{V_t}$$

$$= \frac{37{,}500 * \frac{\pi}{4} * (400 * 10^{-4} \text{ cm})^2 * 120 \text{ cm}}{37{,}700 \text{ cm}^3}$$

$$= 0.15$$

-continued $$v_{bh} = \frac{Q_v}{S_t * \varepsilon_{bh}}$$

$$= \frac{2.29 * 10^{-2} \text{ m}^3/\text{s}}{3.142 * 10^{-2} \text{ m}^3/\text{s} * 0.15}$$

$$= 4.848 \text{ m/s}$$

$$= 484.8 \text{ cm/s}$$

$$Re = \frac{I.D. * v_{bh} * \rho_{ng}}{\mu_{NG}}$$

$$= \frac{(400 * 10^{-4} \text{ cm}) * 484.8 \text{ cm/s} * 0.942 * 10^{-3} \text{ gm/cm}^3}{1.1 * 10^{-4} \text{ poise}}$$

$$= 166.1$$

$$Sh = 1.62 * Pe^{0.33}$$

$$= 1.62 * \left(\frac{Re*Sc*I.D.}{L}\right)^{0.33}$$

$$= 1.62 * \left(\frac{166.1 * 1.167 * 400 * 10^{-4} \text{ cm}}{120 \text{ cm}}\right)^{0.33}$$

$$= 0.656$$

$$Sh = \frac{k_{ext} * I.D.}{D_{TBM-CH4}}$$

$$\Rightarrow k_{ext} = \frac{Sh * D_{TBM-CH4}}{I.D.}$$

$$= \frac{0.656 * 0.1 \text{ cm}^2/\text{s}}{400 * 10^{-4} \text{ cm}}$$

$$= 1.64 \text{ cm/s}$$

The equilibrium constant of zeolite NaY and polymer cellulose acetate for TBM sorption from experimental measurement:

$$S_{polymer} = \frac{C_{polymer}}{C_{gas}} = \frac{C_{polymer}}{\frac{P_T * y_{TBM}}{R * T_{polymer}}} = 460$$

$$S_{zeolite} = \frac{C_{zeolite}}{C_{gas}} = \frac{C_{zeolite}}{\frac{P_T * y_{TBM}}{R * T_{zeolite}}} = 8564$$

In the case of fiber sorbents the polymer also may contributes to sorption ($S_{polymer} \approx 460$) while in case of a pellet the clay binder may not contribute to sorption ($S_{binder} \approx 1$). This contribution can further boost the macropore mass transfer in fiber sorbents.

Using similar calculations, external mass transfer coefficient can be found for a spherical pellet ($r_p = 1.5$ mm).

A schematic diagram indicating various potential mass transfer resistances in fiber sorbents is shown in FIG. 17. Karger and Ruthven summarize complex conditions involving more than one mass transfer resistance. In each of the cases two resistances are analyzed considering the third resistance to be negligible. A comparison of these dimensionless parameters for the cases of fiber sorbents vs. pellets is in the table below.

Comparison of Mass Transfer Resistances in a Fiber Sorbent Vs. Pellet Packed Bed

| Resistances | Formula | Pellet | Fiber sorbent | Controlling resistances |
|---|---|---|---|---|
| External(1) vs. Micropore(3) | $\alpha = \dfrac{k_{ext} * d_{crystal}}{S_{zeolite} * D_{crystal}}$ | 0.01 | 0.01 | $\alpha \to \infty$ (Resistance 3) <br> $\alpha \to 0$ (Resistance 1) |
| External(1) vs. Macropore(2) | $\alpha = \dfrac{k_{ext} * (r_{pellet} \text{ or } t_{wall})}{S_{poly\,or\,binder} * \varepsilon_{fiber\,or\,pellet} * D_{eff}}$ | 153 | 0.007 | $\alpha > 1$ (Resistance 2) <br> $\alpha \ll 1$ (Resistance 1) |
| Macropore(2) vs. Micropore(3) | $\alpha = \dfrac{D_{crystal}}{d^2_{crystal}} \Big/ \dfrac{D_{eff}}{(r^2_{pellet} \text{ or } t^2_{wall})}$ | $\alpha = 100$ <br> $\beta = 1*10^8$ | $\alpha = 7.3$ <br> $\beta = 3*10^5$ | $\beta \to \infty$ (Resistance 2) <br> $\beta \to 0$ (Resistance 3) |

$$\beta = 3 * \alpha * \dfrac{(1 - \varepsilon_{fiber\,or\,pellet})}{(\varepsilon_{fiber\,or\,pellet})} * S_{zeolite}$$

The above table indicates that in the case of fiber sorbents the external resistance is usually a main factor while in the case of pellets the macropore resistance is usually a main factor. External mass transfer resistance (step 1) often depends on the flow conditions of the fluid and the diameter of the fiber, which can be tailored during the fiber spinning step. Also, diffusion of gas molecules into zeolite cages takes place rapidly (step 3). In the case of fiber sorbents, the macropore resistance (step 2) is significantly less compared to a pellet. This can be explained by the small fiber wall thickness ($t_{wall}$=200 μm) vs. the large radius of a commercial spherical pellet ($r_p$=1.5 mm). Even if an attempt is made to decrease the size of the pellets, pressure drop (as calculated by Eurgen equation) increases drastically. In the case of fiber sorbents, the external resistance often controls, while in case of pellets the macropore resistance often controls. External resistance may be tailored by varying the $L/d_t$ ratio of the fiber sorbent module.

In the case of fiber sorbents the barrier wall on the exterior surface of the fiber prevents the diffusion of gases outside the fiber wall. This prevents any premature breakthrough by escape of the gas.

Estimation of Breakthrough Time for Fiber Sorbent Module

Adsorption capacity of zeolite NaY for DMS is usually around 1.10 mmole/gm NaY. Due, to the presence of TBM the capacity for DMS decreases to 0.05 mmole/gm NaY. This is summarized in the table below:

| Gas mixture concentration | Capacity |
|---|---|
| 30 ppm DMS in $N_2$ | 1.1 mmole/gm NaY |
| 30 ppm TBM + 30 ppm DMS in $N_2$ | 0.05 mmole DMS/gm NaY, 0.95 mmole TBM/gm NaY |

Hence, capacity of 0.05 mmole/gm should be considered, because whenever the first trace of sulfur odorant appears at the output the sorbent bed is switched.

$$C_b = \dfrac{(0.5 * C_s * L_{mtz} + C_s * (L - L_{mtz}))}{L}$$

$$= \dfrac{(0.5 * 0.05 \text{ mmole/gm} * L_{MTZ} + 0.05 * (120 \text{ cm} - L_{MTZ}))}{120 \text{ cm}}$$

$$= 0.034 \text{ mmole/gm}$$

-continued

Length of mass transfer zone $$L_{mtz} = 4 * \sqrt{\dfrac{v_{bh} * L}{k_{overall} * a_{sp}}}$$

$$= 4 * \sqrt{\dfrac{484.8 \text{ cm/s} * 120 \text{ cm}}{1.63 \text{ cm/s} * 100 \text{ cm}^2/\text{cm}^3}}$$

$$= 75.56 \text{ cm}$$

$$Q_{TBM} = Q_v * C_{TBM}$$

$$= 2.29 * 10^{-2} \text{ m}^3/\text{s} * 30 \text{ ppm}$$

$$= 2.29 * 10^{-2} \text{ m}^3/\text{s} * 30 * 10^{-6}$$

$$= 6.855 * 10^{-7} \text{ m}^3/\text{s}$$

Hence, Mass Flow Rate of TBM $$\dot{m}_{TBM} = Q_{TBM} * \rho_{TBM}$$

$$= 6.855 * 10^{-7} \text{ m}^3/\text{s} * 1.1 \text{ kg/m}^3$$

$$= 7.5405 * 10^{-7} \text{ kg/sec}$$

TBM adsorbed till breakthrough $$m_{TBM} = C_b \dfrac{\text{mmole TBM}}{\text{gm zeolite}} *$$

$$W_{ads} \text{gm zeolite} * M_{TBM} \dfrac{\text{gm}}{\text{mole}}$$

$$= 0.034 * 10^{-3} \dfrac{\text{mole TBM}}{\text{gm zeolite}} *$$

$$13.44 * 10^3 \text{ gm zeolite} * 90.19 \dfrac{\text{gm TBM}}{\text{mole}}$$

$$= 41.21 \text{ gms TBM}$$

Hence, $$\text{breakthrough time } t_b = \dfrac{m_{TBM}}{\dot{m}_{TBM}}$$

$$= \dfrac{41.21 \text{ gms}}{7.5405 * 10^{-4} \text{ gm/s}} * \dfrac{1 \text{ hour}}{3600 \text{ sec}}$$

$$= 15.18 \text{ hours}$$

This breakthrough time is based on theoretical estimates. The breakthrough time can also be measured experimentally.

Fiber sorbents provide the ability to regenerate rapidly. With fiber sorbents the size of module may sometimes be decreased and still achieve rapid regeneration.

Pressure Drop Calculation Using Hagen-Poiseuille Equation $$\frac{Q_v}{N} = \frac{\pi * \Delta P * (I.D./2)^4}{8 * \mu_{NG} * L} \Rightarrow \Delta P = \frac{Q_v * 8 * \mu_{NG} * L}{N * \pi \times (I.D./2)^4}$$

It is assumed that most of the flow of NG in axial direction flows through the bore and there is negligible flow in porous network in axial direction.

$$\Delta P = \frac{Q_v * 8 * \mu_{NG} * L}{N * \pi * (I.D./2)^4}$$

$$= \frac{2.29 * 10^{-2} \text{ m}^3/\text{s} * 8 * 1.1 * 10^{-5} \text{ Pa-sec} * 1.2 \text{ m}}{37{,}500 \text{ fibers} * \pi * \left(\frac{400 * 10^{-6} \text{ m}}{2}\right)^4}$$

$$= 12{,}801 \text{ Pa}$$

$$= 0.126 \text{ atm}$$

Hence, the fiber sorbents provide a very small pressure drop for gas flow. The table is summarized above.

Regeneration of Fibers

The moles of TBM adsorbed till breakthrough would be:

$$n_{sulfur} = \frac{m_{TBM} * t_b}{M_{TBM}}$$

$$= \frac{7.5405 * 10^{-4} \text{ gm/s} * 15.18 \text{ hours} * 3600 \text{ sec}}{90.19 \text{ gm/gmole}}$$

$$= 0.457 \text{ moles}$$

The temperature for regeneration can be taken about 100° C.-120° C. for TBM.

Hence, during the regeneration step, steam will heat the fibers to about 115° C. from the temperature at adsorption i.e. 25° C.

Total amount of steam required for the operation $\Delta T_{poly} = 90$ K
$\Delta T_{ads} = 90$ K
$Cp_{poly} = 1600$ J/kg K
$Cp_{ads} = 700$ J/kg K
$\Delta H_{sorp} = -37500$ J/mol
$\Delta H_{desorp} = 37500$ J/mol Heat Required $$Q_{heat} = n_{total} * \Delta H_{desorp} + W_{ads} * Cp_{ads} * \Delta T_{ads} + W_{poly} * Cp_{poly} * \Delta T_{poly}$$

$$Q_{heat} = 0.457 \text{ moles/cycle} * 37500 \text{ J/mole} + 13.44 \text{ kgs} * 700 \text{ J/kgK} *$$
$$90 \text{ K} + 4.4 \text{ kgs} * 1600 \text{ J/kgK} * 90 \text{ K}$$

$$= 1.5 * 10^6 \text{ Joules/cycle}$$

Regeneration of Heat Provided by Steam

To provide this heat saturated steam at 122° C. at 2.1 bar pressure will be used. It is assumed here that all the heat provided by the steam is only by latent heat of condensation and the steam does not cool down further, not providing any specific heat. This will be the worst case scenario and will give the maximum amount of steam required.

$$h_{fg} \approx 2196.81 \text{ KJ/kg}$$

Total amount of steam required $m_{steam} * h_{fg} = Q_{heat} \Rightarrow m_{steam}$ $$= \frac{Q_{heat}}{h_{fg}}$$

$$= \frac{1.5 * 10^6 \text{ J}}{2196.8 * 10^3 \text{ J/kg}}$$

$$0.7 \text{ kgs}$$

If the barrier layer on the fiber sorbent fails or due to unavailability, steam cannot be used as the source of regeneration for the fiber sorbents. In that case, hot purge gas ($N_2$, air, methane) can be used as a medium during the regeneration step.

Regeneration Heat Provided by hot $N_2$ Purge

Desired temperature of $N_2$ purge=120° C.

Heat Provided by the Purge Gas $$Q_{heat} m_{N2} * Cp_{N2} * \Delta T_{N2}$$

We assume that the hot $N_2$ cools down from 120° C. to about 40° C., in turn heating the fibers $$\Delta T_{N2} = 80° \text{ C.}$$

$$Cp_{N2} = 1044 \text{ J/kgK} @ 120° \text{ C.}$$

$$m_{N2} = \frac{1.5 * 10^6 \text{ J}}{1044 \text{ J/kgK} * 80° \text{ C.}} = 18 \text{ kgs}$$

From the calculations the breakthrough time is roughly 15 hrs. Hence, 2 regeneration cycles may be required in a day.

$$m_{N2-day} = m_{N2} * \frac{\text{regeneration cycles}}{\text{day}}$$

$$= 18 \text{ kgs} * 2 \frac{\text{regneration cycles}}{\text{day}}$$

$$= 36 \text{ kgs}$$

$$\rho_{N2*} = 1.1 \text{ kg/m}^3$$

$$V_{N2} = \frac{m_{N2-day}}{\rho_{N2}} = \frac{36 \text{ kgs}}{1.1 \text{ kg/m}^3} = 32.6 \text{ m}^3$$

As per the design calculations 480 kgs/day of Hydrogen may be produced from the small size hydrogen generation station. Hot $N_2$ can be a useful alternative for steam in case of small scales of operation (on site generation). For larger scales of operation steam is the option for regeneration medium.

Mode of Operation of Fiber Bed

Due to the release of heat of sorption of sulfur odorants during adsorption step, there is a possibility of rise in temperature of fibers. If this rise in temperature is substantial it can lead to a decrease in the capacity of sorbents in the fiber. Temperature rise of the system can be calculated as follows:

Heat released during sorption=heat gained by the fiber $$n_{total} * \Delta H_{sorp} = (W_{ads} * Cp_{ads} + W_{poly} * Cp_{poly}) * \Delta T_{fiber}$$

$$\Delta T_{fiber} = \frac{n_{total} * \Delta H_{sorp}}{(W_{ads} * Cp_{ads} + W_{poly} * Cp_{poly})} \Rightarrow$$

$$\frac{0.457 \text{ moles/cycle} * 37500 \text{ J/mole}}{13.44 \text{ kgs} * 700 \text{ J/kgK} + 4.4 \text{ kgs} * 1600 \text{ J/kgK}} 1\text{ K}$$

For the low concentration sulfur odorant streams the rise in temperature is not substantial and therefore isothermal operation is assumed. But, for high concentration $H_2S$ streams the rise in temperature could be substantial. In these scenarios cooling water may be passed on the impermeable sheath side of the fibers to maintain constant temperature operation.

Pressure of the Desorbed Gas after the Regeneration Step
$n_{sulfur}$=0.457 moles/cycle
Temperature of the fibers=115° C.=388 K
Volume of Sulfur Odorant in Sorbed State $$V = Q_{sulfur} * t_{break}$$
$$= 6.855 * 10^{-7} \text{ m}^3/\text{s} * 15.18 \text{ hrs} * 3600 \frac{\text{sec}}{\text{hr}}$$
$$= 0.0375 \text{ m}^3$$

Assuming ideal gas law, $$PV = nRT$$
$$P = \frac{nRT}{V}$$
$$= \frac{0.457 \text{ moles/cycle} * 8.3143 \text{ J/mole K} * 388 \text{ K}}{0.0375 \text{ m}^3}$$
$$= 39313.6 \text{ N/m}^2 \text{ } 0.39 \text{ atm}$$

This pressure is not enough to drive the sulfur odorants from the sorbent module. A $N_2$ sweep gas has to be passed continuously during the regeneration step to effectively displaced the desorbed sulfur odorants.

Heat Transfer Calculations

As described in the previous sections, for the regeneration of the fibers, saturated steam would be passed on the sheath side and in order to effectively displace the desorbed sulfur odorants a nitrogen sweep would be passed through the fiber bore.

A comparative study of different heat transfer resistances encountered during the condensation of steam, conduction through the fiber sorbent and the convection by the nitrogen is performed. Time taken by the fibers to reach thermal equilibrium is also calculated. In the calculations there are two unknowns—the temperature at the outer surface of the fiber ($T_o$) and temperature at the inner wall of the fiber ($T_i$). A schematic diagram indicating various potential heat transfer resistances in fiber sorbents is shown in FIG. 18.

Resistance Due to Convective Heat Transfer by Steam

Saturated steam at 122° C. at 2.1 bar pressure condenses to water at 122° C. The properties of the condensate film are evaluated at the film temperature.

$$T_{film} = \frac{T_{steam} + T_{fiber}}{2} = \frac{122° \text{ C.} + 25° \text{ C.}}{2} = 73.5° \text{ C.}$$

$\rho_{film} = 939 \text{ kg/m}^3$ $\rho_{steam}$ 1 kg/m$^3$ $k_{film} = 0.68 \text{ W/mK}$ $\mu_{film} = 2.21 * 10^{-4} \text{ kg/m. sec}$ $h_{fg} = 2196.81 \text{ kJ/kg}$ $N = 37{,}500 \text{ fibers}$ diameter of dual layer fiber, $$d_{dual\ layer} = O.D. + 2 * t_{barrier}$$
$$= 800 \text{ } \mu\text{m} + 2 * 100 \text{ } \mu\text{m}$$
$$= 1000 \text{ } \mu\text{m}$$

It is assumed that the heat provided by steam is only due to condensation and it does not cool down further while in contact with fibers. This is the worst case scenario where the heat transfer would be a minimum.

The convection heat transfer coefficient for condensation of steam outside a tube (Assuming a fully developed laminar flow)

$$h_0 = 0.725 \left[ \frac{\rho_{film} * (\rho_{film} - \rho_{steam}) * g * h_{fg} * k_{film}^3}{N * d_{dual\ layer} * \mu_{film} * (T_{steam} - T_o)} \right]^{(1/4)}$$

$$h_0 = 0.725 \left[ \frac{(939)^2 \text{ kg/m}^3 * 9.81 \text{ m/s}^2 * 2196.81 *}{37{,}500 * 1000 * 10^{-6} \text{ m} * 2.21 *} \right]^{(1/4)}$$

$$h_0 = 3756 * (122° \text{ C.} - T_o)^{-(1/4)} \text{ W/m}^2 \text{ K}$$

$$R_0 = \frac{1}{h_0 A_0}$$
$$= \frac{1}{h_0 * N * \pi * d_{dual\ layer} * L} \Rightarrow$$
$$\frac{(122° \text{ C.} - T_o)^{(1/4)}}{3756 \text{ W/m}^2 \text{ K} * 37{,}500 \text{ fibers} *}$$
$$\pi * 1000 * 10^{-6} \text{ m} * 1.2 \text{ m}$$
$$= 1.9 * 10^{-6} * (122° \text{ C.} - T_o)^{(1/4)} \text{ K/W}$$

Resistance Due to Conduction Through the Fiber Sorbent

Average thermal conductivity through the fiber wall including that of zeolite, air in void, polymers (CA and PVDC)

$$k_{fiber} = 0.75 * (k_{core}) + 0.25 * (k_{sheath})$$

$$k_{fiber} = 0.75 * \left( \frac{\Phi_{poly} * k_{poly} + \Phi_{ads} *}{k_{ads} + \Phi_{void} * k_{void/air}} \right) + 0.25 * (k_{PVDC})$$

$$k_{fiber} = 0.75 * \begin{pmatrix} 0.2 * 0.5 \text{ W/mK} + \\ 0.6 * 0.8 \text{ W/mK} + \\ 0.2 * 0.024 \text{ W/mK} \end{pmatrix} + 0.25(0.5 \text{ W/mK})$$

$$k_{fiber} = 0.56 \text{ W/mK}$$

$$R_{fiber} = \frac{\ln(r_{dual\ layer} / r_i)}{2\pi N L k_{fiber}}$$
$$= \frac{\ln(500 \text{ } \mu\text{m.} / 200 \text{ } \mu\text{m})}{2\pi * 37{,}500 \text{ fibers} * 1.2 \text{ m} * 0.56 \text{ W/mK}}$$
$$= 5.7 * 10^{-6} \text{ K/W}$$

Resistance Due to Convective Flow of $N_2$ Sweep Gas

Assuming that the $N_2$ sweep gas is provided at ambient conditions ($T_{N2}$=25° C.). Assuming linear flow of $N_2$ sweep gas and a fully developed velocity profile $k_{N2} = 0.026$ W/mK Nusselt Number $(Nu) 3.66$ $$h_i = \frac{Nu * k_{N2}}{I.D.} = \frac{3.66 * 0.026 \text{ W/m.K}}{400 * 10^{-6} \text{ m}} = 238 \text{ W/m}^2.K$$

$$R_i = \frac{1}{h_i A_i}$$
$$= \frac{1}{h_i * n * \pi * I.D. * L}$$
$$= \frac{1}{238 \text{ W/m}^2 \text{ K} * 37{,}500 \text{ fibers} * \pi * 400 * 10^{-6} \text{ m} * 1.2 \text{ m}}$$
$$= 7.4 * 10^{-5} \text{ K/W}$$

Calculating the Temperature at the Outer Surface of the Fiber ($T_O$) and Temperature at the Inner Wall of the Fiber ($T_i$)

From Energy Balance, Flux at Each Part $$\Rightarrow \frac{(T_{steam} - T_o)}{R_o} = \frac{(T_o - T_i)}{R_{fiber}}$$
$$= \frac{(T_i - T_{N2})}{R_i}$$

$$\Rightarrow \frac{(122^\circ \text{ C.} - T_o)}{1.9 * 10^{-6} * (122^\circ \text{ C.} - T_o)^{(1/4)} \text{ K/W}} = \frac{(T_o - T_i)}{5.7 * 10^{-6} \text{ K/W}}$$
$$= \frac{(T_i - 25^\circ \text{ C.})}{7.4 * 10^{-5} \text{ K/W}}$$

There are two equations and two unknowns. Hence, solving for $T_o$ and $T_i$ $$\Rightarrow T_o = 119^\circ \text{ C.}, T_i = 112^\circ \text{ C.}$$

Substituting the values of $T_o$ we get the value of resistance $R^\circ$,

Hence, $R_0 = 1.9*10^{-6}*(122^\circ \text{ C.} -119^\circ \text{ C.})^{(1/4)\,\circ \text{ K/W}} = 2.5*10^{-6}$ K/W $h_0 3756*(122^\circ \text{ C.} - T_o)^{-(1/4)}$ W/m$^2$K$=3756*(122^\circ$ C.$-119^\circ$ C.$)^{-(1/4)}$ W/m$^2$K$=3261$ W/m$^2$K Comparison of Heat Transfer Resistances $$\Rightarrow \frac{\text{Conductive heat transfer resistance through fiber}}{\text{Convective heat transfer resistance by steam condensation}} =$$

$$\frac{R_{fiber}}{R_0} = \frac{5.7 * 10^{-6} \text{ K/W}}{2.5 * 10^{-6} \text{ K/W}} = 2.3$$

$$\Rightarrow \frac{\text{Conductive heat transfer resistance through fiber}}{\text{Convective heat transfer resistance by Nitrogen sweep}} =$$

$$\frac{R_{fiber}}{R_i} = \frac{5.7 * 10^{-6} \text{ K/W}}{7.4 * 10^{-5} \text{ K/W}} = 0.08$$

From the above analysis it can be said that internal heat conduction through the fiber is comparable to heat transfer from convection due to steam. This is due to the high heat transfer coefficient due to steam condensation and the relatively low thermal conductivity of polymers compared to metals. If the regeneration medium was hot nitrogen instead of steam the convective heat transfer coefficient on the outside of the fiber would be lower than the conduction through the fiber.

Calculation of Time Required for Fibers to Reach Thermal Equilibrium

To find the time required for the fibers to reach thermal equilibrium one considers an unsteady state process. In order to simplify the calculations the hollow fiber sorbents can be considered to be an infinite cylinder with a very high aspect ratio $$\text{Aspect ratio of the fibers} = \frac{L_{fiber}}{d_{dual\ layer}} = \frac{1.2 \text{ m}}{1000 * 10^{-6} \text{ m}} = 1200$$

Density of the fiber $\rho_{fiber} = \Phi_{poly} * \rho_{poly} + \Phi_{ads} * \rho_{ads} + \Phi_{void} * \rho_{void}$ $$\rho_{fiber} = 0.20 * 1300 \text{ kg/m}^3 +$$
$$0.6 * 1320 \text{ kg/m}^3 + 0.2 * 0 \text{ kg/m}^3$$
$$= 1052 \text{ kg/m}^3$$

Specific heat of fiber $Cp_{fiber} =$ $$\Phi_{poly} * Cp_{poly} + \Phi_{ads} * Cp_{ads} + \Phi_{void} * Cp_{void/air}$$

$$Cp_{fiber} = 0.20 * 1600 \text{ J/Kg-K} + 0.6 * 2500 \text{ J/Kg-K} +$$
$$0.2 * 1000 \text{ J/Kg-K}$$
$$= 2020 \text{ J/Kg-K}$$

$k_{fiber} = 0.56$ W/mK $h_0 = h_{fiber} = 3261$ W/m$^2$ K

Thermal diffusivity of fiber $(\alpha) =$ $$\frac{k_{fiber}}{\rho_{fiber} * Cp_{fiber}} = \frac{0.56 \text{ W/mK}}{1052 \text{ kg/m}^3 * 2020 \text{ J/kg-K}} = 2.6 * 10^{-7} \text{ m}^2/\text{s}$$

$$\frac{k_{fiber}}{h_{fiber} * O.D.} = \frac{0.56 \text{ W/mK}}{3261 \text{ W/m}^2 \text{ K} * 1000 * 10^{-6} \text{ m}} = 0.17$$

$T_i = 112^\circ$ C.

Using Heisler's chart for infinite cylinder and substituting values the following results $$\frac{\alpha_{fiber} * \tau_{eq.}}{r_{dual\ layer}^2} = 1.4$$

$$\tau_{eq.} = \frac{1.4 * r_{dual\ layer}^2}{\alpha_{fiber}} = \frac{1.4 * (500 * 10^{-6} \text{ m})^2}{2.6 * 10^{-7} \text{ m}^2/\text{s}} = 1.3 \text{ seconds}$$

This is the time required for the fibers to reach thermal equilibrium once the temperature outside the fiber is isothermal at 122° C. This clearly indicates that the fiber sorbents can be heated rapidly and RTSA cycles are feasible.

The claimed subject matter is not to be limited in scope by the specific embodiments described herein. Indeed, various modifications of the invention in addition to those described herein will become apparent to those skilled in the art from the foregoing description. Such modifications are intended to fall within the scope of the appended claims.

All references cited herein are incorporated herein by reference in their entirety to the extent that they are not inconsistent and for all purposes to the same extent as if each individual publication, patent or patent application was specifically and individually indicated to be incorporated by reference in its entirety for all purposes.

The citation of any publication is for its disclosure prior to the filing date and should not be construed as an admission that the present invention is not entitled to antedate such publication by virtue of prior invention.

We claim:

1. A fiber comprising a porous core and a sheath surrounding said porous core wherein the core comprises a sorbent and a polymer and wherein the sheath is characterized by a heat resistance of at least about 110° C. and one or more of the following:
   (1) a water vapor transmission rate (WVTR) of less than about 50 Barrer at 38° C. and 90% relative humidity; or
   (2) an $O_2$ permeability of less than about 10 Barrer; or
   (3) an $N_2$ permeability of less than about 1 Barrer; or
   (4) a $CO_2$ permeability of less than about 20 Barrer.

2. The fiber of claim 1 wherein the sheath has an average thickness of from about 0.1 to about 100 microns.

3. The fiber of claim 1 wherein the sheath comprises a polymer selected from the group consisting of polyethylene terephthalate, polyvinylidene chloride, polyimide, polyacrylonitrile, polyester urethane, neoprene, polyether amide block co-polymer and mixtures thereof.

4. The fiber of claim 1 wherein the sorbent has a selectivity for a compound comprising sulfur over methane of about 10 to about 70.

5. The fiber of claim 1 wherein the sorbent has a surface area of at least 200 $m^2/g$.

6. The fiber of claim 1 wherein the sorbent is selected from the group consisting of molecular sieve zeolites, MFI zeolites, activated carbon, activated alumina, silicates, amine-grafted silica, silico-aluminophosphates, aluminosilicates, aluminophosphates, metal oxides, and mixtures thereof.

7. The fiber of claim 6 wherein the zeolite is selected from the group consisting of zeolite 4A, 5A, Bx, NaX, NaY, faujasite, beta, mordenite, ZSM-5, ion exchanged zeolites, and mixtures thereof.

8. The fiber of claim 1 wherein the sorbent comprises at least 70% by weight of the fiber based on total dry fiber weight.

9. The fiber of claim 1 wherein the polymer is selected from the group consisting of a cellulose acetate, polyvinylpyrrolidone, polysulfone, epichlorohydrin, a polyether amide block copolymer, polyimides, polyolefins, polypropylene, polyethylene, polyamides, poly(tetrafluoroethene), polyvinylidene chloride, polystyrene, polyisobutylene, polybutadiene, polyurethanes, elastomers, and copolymers and mixtures thereof.

10. The fiber of claim 1 wherein the sorbent is NaY, the polymer is cellulose acetate, the sheath comprises polyvinylidene chloride; wherein the sorbent comprises at least 70% by weight of the fiber based on total dry weight; and wherein the $N_2$ permeance is less than 5 (GPU) at 30 psig.

11. The fiber of claim 1 wherein said fiber further comprises a lumen adjacent to the porous core.

12. In a multi-layer spinning process for making a sheath on a fiber comprising spinning a sheath dope with a core dope to form a fiber comprising a porous core and a sheath surrounding said porous core wherein the improvement comprises employing a sheath dope composition which comprises a polyvinylidene chloride and a solvent comprising a dipolar aprotic solvent wherein the polyvinylidene chloride comprises at least about 15 weight percent based on the total weight of the composition.

13. The process of claim 12 wherein the dipolar aprotic solvent is selected from the group consisting of N-methylpyrrolidone, dimethylformamide, dimethyl acetamide, DMSO, tetrahydrofuran, toluene, and mixtures thereof.

14. The process of claim 12 wherein said sheath dope composition comprises from about 15 to about 60 weight percent polyvinylidene chloride and from about 40 to about 70 percent by weight N-methylpyrrolidone based on the total weight of the composition.

15. The process of claim 14 wherein said sheath dope composition further comprises tetrahydrofuran, acetone, n-heptane, or a mixture thereof.

16. The process of claim 12 wherein said sheath dope composition comprises (a) from about 0 to about 2 weight percent of water based on the total weight of the composition or (b) from about 1 to about 5 wt % of ethanol, acetic acid, propionic acid or mixture thereof based on the total weight of the composition.

17. The composition of claim 12 wherein said sheath dope composition comprises less than about 1 weight percent of water based on the total weight of the composition.

18. A process for reducing the amount of one or more low level contaminants of a gas stream comprising:
   (a) contacting the gas stream comprising an initial concentration of one or more low level contaminants with one or more fibers which comprises a porous core and a sheath surrounding said porous core wherein the core comprises a sorbent and a polymer and wherein the sheath is characterized by a heat resistance of at least about 110° C. and one or more of the following:
      (1) a water vapor transmission rate (WVTR) of less than about 50 Barrer at 38° C. and 90% relative humidity; or
      (2) an $0_2$ permeability of less than about 10 Barrer; or
      (3) an $N_2$ permeability of less than about 1 Barrer; or
      (4) a $C0_2$ permeability of less than about 20 Barrer;
      wherein said contacting is conducted in a manner such that the initial concentration of one or more low level contaminants in the gas stream is reduced by sorption of said one or more low level contaminants on said sorbent; and then
   (b) regenerating one or more fibers by passing a regenerating fluid which has a temperature of at least about 50° C. over the sheath layer of said fiber in a manner such that the fluid does not substantially contact the porous core.

19. The process of claim 18 wherein the gas stream comprises natural gas, a petrochemical stream, city gas, diesel fuel, gasoline, LPG, jet fuel, a reformate gas, naptha and mixtures thereof; wherein a low level contaminant comprises one or more compounds comprising sulfur; and wherein steps (a) and (b) are repeated at least two or more times.

20. The process of claim 19 wherein the initial concentration of the compounds comprising sulfur is from about 5 to about 1000 ppm and wherein said contacting reduces the initial concentration of the compound comprising sulfur to a concentration of less than about 1 ppm.

21. The process of claim 18 which further comprises employing the gas stream with the reduced amount of low level contaminates as a fuel.

22. The process of claim 18 wherein the regenerating fluid which has a temperature of at least about 50° C. comprises steam, hot water, a gas, or a mixture thereof.

23. The process of claim 18 which further comprises recovering at least a portion of the initial concentration of one or more low level contaminants.

24. The process of claim 18 wherein the one or more fibers are substantially aligned within a compartment comprising a gas stream inlet and outlet and a regenerating fluid inlet and outlet.

25. The process of claim 18 wherein a majority of the one or more of the fibers further comprises a lumen adjacent to the porous core.

* * * * *